United States Patent
Johansson et al.

(10) Patent No.: US 10,477,502 B2
(45) Date of Patent: Nov. 12, 2019

(54) NOTIFICATION OF DELIVERY OF A RRLP MULTILATERATION TIMING ADVANCE REQUEST MESSAGE TO A BASE STATION SUBSYSTEM (BSS)

(71) Applicant: TELEFONAKTIEBOLAGET L M ERICSSON (PUBL), Stockholm (SE)

(72) Inventors: Nicklas Johansson, Brokind (SE); John Walter Diachina, Garner, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/886,727

(22) Filed: Feb. 1, 2018

(65) Prior Publication Data
US 2018/0220390 A1 Aug. 2, 2018

Related U.S. Application Data

(60) Provisional application No. 62/456,991, filed on Feb. 9, 2017, provisional application No. 62/453,843, filed on Feb. 2, 2017.

(51) Int. Cl.
*H04W 56/00* (2009.01)
*H04W 28/24* (2009.01)
(Continued)

(52) U.S. Cl.
CPC ....... *H04W 56/0045* (2013.01); *H04L 45/502* (2013.01); *H04W 28/24* (2013.01);
(Continued)

(58) Field of Classification Search
CPC ............. H04W 56/0045; H04W 64/00; H04W 72/1205; H04W 28/24; H04W 68/00;
(Continued)

(56) References Cited

U.S. PATENT DOCUMENTS 6,317,421 B1 * 11/2001 Wilhelmsson .......... H04L 29/06
370/328
6,711,143 B1 * 3/2004 Balazinski ............ H04W 92/14
370/329

(Continued)

OTHER PUBLICATIONS

Ericsson LM et al., "New Work Item on Positioning Enhancements for GERAN", RP-161260, RAN#72, Jun. 13-16, 2016.
(Continued)

*Primary Examiner* — Sharad Rampuria

(57) ABSTRACT

The present disclosure describes various techniques for enabling a Serving GPRS Support Node (SGSN) to provide a Base Station System (BSS) with an indication that a Logical Link Control (LLC) Protocol Data Unit (PDU) sent to a given wireless device contains a Radio Resource Location services Protocol (RRLP) Multilateration Timing Advance Request message such that the BSS after transmitting the LLC PDU to the given wireless device may invoke Timing Advance estimation algorithms for reception of uplink Packet Associated Control Channel (PACCH) acknowledgement block(s) (e.g., Extended Coverage (EC)-PACCH acknowledgment block(s)) from the given wireless device.

24 Claims, 13 Drawing Sheets

(51) Int. Cl.
　　　*H04W 72/12*　　(2009.01)
　　　*H04L 12/723*　　(2013.01)
　　　*H04W 64/00*　　(2009.01)
　　　*H04W 76/10*　　(2018.01)
　　　*H04W 68/00*　　(2009.01)

(52) U.S. Cl.
　　　CPC ....... *H04W 64/00* (2013.01); *H04W 72/1205* (2013.01); *H04W 68/00* (2013.01); *H04W 76/10* (2018.02)

(58) Field of Classification Search
　　　CPC ............. H04W 76/10; H04W 72/0446; H04L 45/502; H04B 7/2618
　　　See application file for complete search history.

(56) References Cited

U.S. PATENT DOCUMENTS

| | | | |
|---|---|---|---|
| 2001/0009544 A1* | 7/2001 | Vanttinen | H04W 64/00 370/338 |
| 2005/0007980 A1* | 1/2005 | Landais | H04W 4/02 370/331 |
| 2006/0293066 A1 | 12/2006 | Edge et al. | |
| 2012/0063464 A1 | 3/2012 | Mehta | |
| 2016/0249193 A1 | 8/2016 | Edge et al. | |

OTHER PUBLICATIONS

Ericsson LM, "Positioning Enhancements for GERAN—introducing TA trilateration", RP-161034, RAN#72, Jun. 13-16, 2016.
Nokia, "Serving Cell TA Estimation for Multilateration Positioning", R6-170045, RAN6#3, Feb. 13-17, 2017.
3GPP TS 48.018 "Base Station System (BSS)—Serving GPRS Support Node (SGSN)", BSS GPRS Protocol (BSSGP), Dec. 2016.
LG Electronics et al. "Revision of SI: Feasibility Study on LTE-based V2X Services" RP-161263, CR 43.059-0081 RAN6#2, Jun. 13-16, 2016, pp. 1-9.
Ericsson LM: "Introduction of Multilateration", R6-160xxx (Revision of R6-160263), 3GPP TSG-RAN6 Meeting #3, change request 43.059, version 13.2.0, Athens, Greece, Feb. 13-17, 2017, pp. 1-11.
Ericsson LM: "Introduction of Multilateration", R6-160263 (Revision of R6-160149), 3GPP TSG-RAN6 Meeting #2, change request 43.059 CR 0081, version 13.2.0, Reno, Nevada, U.S.A., Nov. 14-18, 2016, pp. 1-11.
3GPP TS 43.059 V13.2.0 (May 2016), 3rd Generation Partnership Project; Technical Specification Group GSM/EDGERadio Access Network; Functional stage 2 description of Location Services (LCS) in GERAN (Release 13), dated Jun. 1, 2016, the whole document.
Ericsson LM: "Introduction of Multilateration", R6-160274 (Revision of R6-160263), 3GPP TSG-RAN6 Meeting #2, change request 43.059-0081 rev 3, version 13.2.0, Reno, Nevada, U.S.A., Nov. 14-18, 2016, pp. 1-11.
3GPP TS 48.071 V13.0.0 (Jan. 2016), 3rd Generation Partnership Project; Technical Specification Group GSM/EDGE Radio Access Network; Location Services (LCS); Serving Mobile Location Centre—Base Station System (SMLC-BSS) interface; Layer 3 specification (Release 13), dated Jan. 6, 2016, the whole document.
3GPP TS 49.031 V13.0.0 (Jan. 2016), 3rd Generation Partnership Project; Technical Specification Group GSM/EDGE Radio Access Network; Location Services (LCS); Base Station System Application Part LCS Extension (BSSAP-LE) (Release 13), Jan. 6, 2016. the whole document.
Ericsson LM: "Analysis of MS Transmission Accuracy", R6Telco-16xxxx, RAN WG6 telco on ePOS_GERANN, Dec. 15, 2016, the whole document.
3GPP TS 44.018 V14.0.0 (Dec. 2016), 3rd Generation Partnership Project; Technical Specification Group Radio Access Network; Mobile radio interface layer 3 specification; GSM/EDGE Radio Resource Control (RRC) protocol (Release 14), Dec. 23, 2016, the whole document.
LM Ericsson: "Multilateration Procedure—TA Only", R6-160273 (revision of R6-160261), RAN WG6 Meeting #2, Reno, Nevada USA, Nov. 14-18, 2016, pp. 17-18.
Ericsson: "On timing advance based multi-leg positioning for NB-IoT", R1-167426, 3GPP TSG-RAN1 Meeting #86, Gothenburg, Sweden; Aug. 22-26, 2016, the whole document.
LM Ericsson: "Provisioning of a Multilateration timer to the SGSN", R6-170002, ePOS_GERAN, REL-14, RAN WG6 Meeting#3, Feb. 13-17, 2017, Athens, Greece, the whole document.
3rd Generation Partnership Project; Technical Specification Group Radio Access Network; Functional stage 2 description of Location Services (LCS) in GERAN (Release 14), 3GPP Standard; Technical Specification ; 3GPP TS 43.059, vol. RAN WG6, No. V14.0.0, Mar. 20, 2017 (Mar. 20, 2017), pp. 1-82.

\* cited by examiner

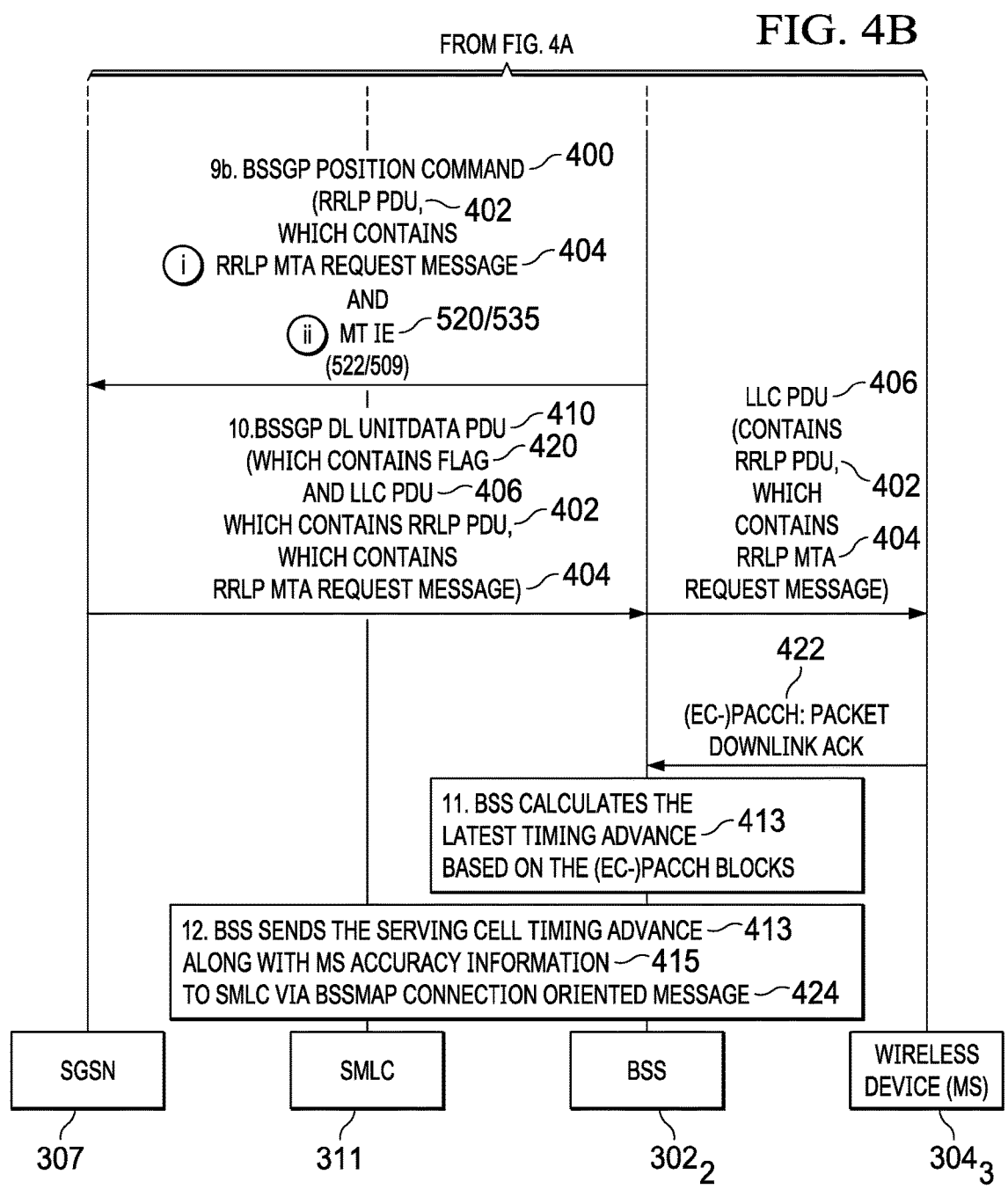

DL-UNIT DATA PDU CONTENTS

| INFORMATION ELEMENT | TYPE/REFERENCE | PRESENCE | FORMAT | LENGTH |
|---|---|---|---|---|
| PDU TYPE | PDU TYPE/11.3.26 | M | V | 1 |
| TLLI (CURRENT) | TLLI/11.3.35 | M | V | 4 |
| QoS PROFILE (NOTE 1) | QoS PROFILE/11.3.28 | M | V | 3 |
| PDU LIFETIME | PDU LIFETIME/11.3.25 | M | TLV | 4 |
| MS RADIO ACCESS CAPABILITY (NOTE 2) | MS RADIO ACCESS CAPABILITY/11.3.22 | O | TLV | 7-? |
| PRIORITY (NOTE 3) | PRIORITY/11.3.27 | O | TLV | 3 |
| DRX PARAMETERS (NOTE 11) | DRX PARAMETERS/11.3.11 | O | TLV | 4 |
| IMSI (NOTE 14) | IMSI/11.3.14 | O | TLV | 5-10 |
| TLLI (OLD) | TLLI/11.3.35 | O | TLV | 6 |
| PFI | PFI/11.3.42 | O | TLV | 3 |
| LSA INFORMATION | LSA INFORMATION/11.3.19 | O | TLV | 7-? |
| SERVICE UTRAN CCO | SERVICE UTRAN CCO/11.3.47 | O | TLV | 3 |
| SUBSCRIBER PROFILE ID FOR RAT/FREQUENCY PRIORITY (NOTE 5) | SUBSCRIBER PROFILE ID FOR RAT/FREQUENCY PRIORITY/11.3.105 | O | TLV | 3 |
| REDIRECTION INDICATION (NOTE 6) | REDIRECTION INDICATION/11.3.112 | O | TLV | 3 |
| REDIRECTION COMPLETED (NOTE 7) | REDIRECTION COMPLETED/11.3.113 | O | TLV | 3 |
| UNCONFIRMED SEND STATE VARIABLE (NOTE 9) | UNCONFIRMED SEND STATE VARIABLE/11.3.114 | C | TLV | 4 |
| SCI (NOTE 10) | SCI/ 11.3.116 | O | TLV | 3 |
| GGSN/P-GW LOCATION (NOTE 10) | GGSN/P-GW LOCATION/11.3.117 | O | TLV | 3 |
| eDRX PARAMETERS (NOTE 11) | eDRX PARAMETERS/11.3.122 | O | TLV | 3 |
| COVERAGE CLASS | COVERAGE CLASS/11.3.124 | O | TLV | 3 |
| OLD ROUTING AREA IDENTIFICATION (NOTE 12) | OLD ROUTING AREA IDENTIFICATION/11.3.127 | O | TLV | 8 |
| ATTACH INDICATOR (NOTE 13) | ATTACH INDICATOR/11.3.128 | O | TLV | 3 |
| SGSN GROUP IDENTITY (NOTE 15) | SGSN GROUP IDENTITY/11.3.131 | C | TLV | 5 |
| ADDITIONAL P-TMSI (NOTE 15) | ADDITIONAL P-TMSI/11.3.132 | C | TLV | 6 |
| UE USAGE TYPE (NOTE 15) | UE USAGE TYPE/11.3.133 | C | TLV | 3 |

FROM FIG. 5A

| | | | | |
|---|---|---|---|---|
| MESSAGE INDICATOR (NOTE 16) | MESSAGE INDICATOR/11.3.xxx | C | TLV | 3 |
| ALIGNMENT OCTETS | ALIGNMENT OCTETS/11.3.1 | O | TLV | 2-5 |
| LLC-PDU (NOTE 4) | LLC-PDU/11.3.15 | M | TLV | 2-? |
| INITIAL LLC-PDU (NOTE 8) | LLC-PDU/11.3.15 | O | TLV | 2-? |

NOTE 1: SOME ATTRIBUTES OF THE QoS PrOFILE SHALL BE DISCARDED IF THE PFI FIELD IS PRESENT AND CORRESPONDS TO A KNOWN PFC IN THE BSS.
NOTE 2: THE FIELD SHALL BE PRESENT IF THERE IS VALID MS RADIO ACCESS CAPABILITY INFORMATION KNOWN BY THE SGSN; THE FIELD SHALL NOT BE PRESENT OTHERWISE.
NOTE 3: THE PRIORITY FIELD SHALL BE DISCARDED IF THE PFI FIELD IS PRESENT AND CORRESPONDS TO A KNOWN PFC IN THE BSS FOR WHICH THE ARP FIELD WAS RECEIVED.
NOTE 4: THE LLC-PDU LENGTH INDICATOR MAY BE ZERO.
NOTE 5: THIS IE MAY BE INCLUDED IF AVAILABLE IN THE SGSN. IF THE SERVICE UTRAN CCO IE IS PRESENT WITH THE VALUE OF "SHALL NOT" THE SERVICE UTRAN CCO IE TAKES PRECEDENCE OVER THIS IE.
NOTE 6: THIS IE SHALL BE INCLUDED IF REDIRECT ATTEMPT FLAG WAS PRESENT IN UL-UNITDATA AND THE CN REQUESTS REROUTING BY THE BSC TO ANOTHER CN OPERATOR.
NOTE 7: THIS IE SHALL BE INCLUDED IF REDIRECT ATTEMPT FLAG WAS PRESENT IN UL-UNITDATA AND THE REDIRECTION IS COMPLETED.
NOTE 8: THE INITIAL LAYER 3 INFORMATION RECEIVED FROM MS. ONLY PRESENT WHEN REDIRECTION INDICATION IS PRESENT.
NOTE 9: CONTAINS THE VALUE OF THE V(U) AS DEFINED IN 3GPP TS 44.064 [12] IF REDIRECTION INDICATION IE IS PRESENT.
NOTE 10: THESE IEs ARE INCLUDED WHEN THE SGSN SUPPORTS THE SIRUG FEATURE AND THE RECEIVED GTP-U PACKET CONTAINED THE SCI IE.
NOTE 11: IF THE SGSN HAS VALID eDRX PARAMETERS FOR A TLLI IT SHALL INCLUDE THE eDRX PARAMETERS IE (SEE SUB-CLAUSE 6.1) IN WHICH CASE THE DRX PARAMETERS IE SHALL NOT BE INCLUDED.
NOTE 12: THIS IE IS ONLY INCLUDED WHEN REDIRECTION INDICATION IS PRESENT AND THE SGSN SUPPORTS CS/PS COORDINATION ENHANCEMENTS.
NOTE 13: THIS IE INDICATES A GPRS ATTACH REQUEST FROM THE MS. IT MAY ONLY BE INCLUDED IF REDIRECTION INDICATION IS PRESENT AND THE SGSN SUPPORTS CS/PS COORDINATION ENHANCEMENTS.
NOTE 14: THIS IE IS INCLUDED IF THE IMSI WAS RETRIEVED UNENCRYPTED FROM THE MS AND THE SGSN SUPPORTS DEDICATED CORE NETWORKS.
NOTE 15: THIS IE IS INCLUDED IF THE SGSN SUPPORTS DEDICATED CORE NETWORKS AND IS INCLUDED WHEN THE "REDIRECTION INDICATION" IE IS PRESENT.
NOTE 16: THIS IE IS INCLUDED WHEN THE SGSN NEEDS TO INDICATE TO THE BSS THAT THE LLC PDU CONTAINS A SPECIFIC HIGHER LAYER MESSAGE SUCH AS RRLP MULTILATERATION TIMING ADVANCE REQUEST MESSAGE.

| | 8 | 7 | 6 | 5 | 4 | 3 | 2 | 1 |
|---|---|---|---|---|---|---|---|---|
| | MESSAGE INDICATOR IE | | | | | | | |
| OCTET 1 | IEI | | | | | | | |
| OCTET 2 | LENGTH INDICATOR | | | | | | | |
| OCTET 3 | MESSAGE INDICATOR | | | | | | | |

| MESSAGE INDICATOR BITS | |
|---|---|
| CODING | SEMANTIC |
| 00000000 | LLC PDU CONTAINS RRLP MULTILATERATION REQUEST MESSAGE |
| | ALL OTHER VALUES ARE RESERVED |

| POSITION-COMMAND PDU CONTENT | | | | |
|---|---|---|---|---|
| INFORMATION ELEMENTS | TYPE/REFERENCE | PRESENCE | FORMAT | LENGTH |
| PDU TYPE | PDU TYPE/11.3.26 | M | V | 1 |
| TLLI | TLLI/11.3.35 | M | TLV | 6 |
| BVCI (PCU-PTP) | BVCI/11.3.6 | M | TLV | 4 |
| RRLP FLAGS | RRLP FLAGS/11.3.60 | M | TLV | 3 |
| RRLP APDU | RRLP APDU/11.3.49 | M | TLV | 3-? |
| MULTILATERATION TIMER | MULTILATERATION TIMER/11.3.xxx | O | TLV | 3 |

535 — RRLP FLAGS
402 — RRLP APDU
520 — MULTILATERATION TIMER ns may invoke Timing Advance estimation algorithms for reception of uplink Packet Associated Control Channel (PACCH) acknowledgement block(s) (e.g., Extended Coverage (EC)-PACCH acknowledgment block(s)) from the given wireless device.

NOTIFICATION OF DELIVERY OF A RRLP MULTILATERATION TIMING ADVANCE REQUEST MESSAGE TO A BASE STATION SUBSYSTEM (BSS)

CLAIM OF PRIORITY

This application claims the benefit of priority to U.S. Provisional Application Ser. Nos. 62/453,843 and 62/456,991, respectively filed on Feb. 2, 2017 and Feb. 9, 2017; the entire contents of each of these documents are hereby incorporated herein by reference for all purposes.

RELATED PATENT APPLICATION

This application is related to the co-filed U.S. patent application Ser. No. 15/886,616 entitled "Notification of Ongoing Multilateration Timing Advance (MTA) Procedure to a Serving GPRS Support Node (SGSN)", which claims the benefit of priority to U.S. Provisional Application Ser. No. 62/453,843, filed on Feb. 2, 2017. The entire contents of each of these documents are hereby incorporated herein by reference for all purposes.

TECHNICAL FIELD

The present disclosure relates generally to the wireless telecommunications field and, more particularly, to various techniques for enabling a Serving GPRS Support Node (SGSN) to provide a Base Station System (BSS) with an indication that a Logical Link Control (LLC) Protocol Data Unit (PDU) sent to a given wireless device contains a Radio Resource Location services Protocol (RRLP) Multilateration Timing Advance Request message such that the BSS may invoke Timing Advance estimation algorithms for reception of uplink Packet Associated Control Channel (PACCH) acknowledgement block(s) (e.g., Extended Coverage (EC)-PACCH acknowledgment block(s)) from the given wireless device.

BACKGROUND

The following abbreviations and terms are herewith defined, at least some of which are referred to within the following description of the present disclosure.
3GPP 3rd-Generation Partnership Project
ASIC Application Specific Integrated Circuit
BSS Base Station Subsystem
BTS Base Transceiver Station
CN Core Network
DL Downlink
DSP Digital Signal Processor
EC Extended Coverage
EC-GSM Extended Coverage Global System for Mobile Communications
eNB Evolved Node B
EDGE Enhanced Data rates for GSM Evolution
EGPRS Enhanced General Packet Radio Service
GSM Global System for Mobile Communications
GERAN GSM/EDGE Radio Access Network
GPRS General Packet Radio Service
IE Information Element
IoT Internet of Things
LLC Logical Link Control
LTE Long-Term Evolution
MME Mobility Management Entity
MPM Multilateration Positioning Method
MS Mobile Station
MTA Multilateration Timing Advance
MTC Machine Type Communications
NB-IoT Narrow Band Internet of Things
PACCH Packet Associated Control Channel
PDN Packet Data Network
PDU Protocol Data Unit
RAN Radio Access Network
RLC Radio Link Control
RRLP Radio Resource Location Services Protocol
SGSN Serving GPRS Support Node
SMLC Serving Mobile Location Center
TA Timing Advance
TBF Temporary Block Flow
TS Technical Specification
TSG Technical Specification Group
UE User Equipment
UL Uplink
WCDMA Wideband Code Division Multiple Access
WiMAX Worldwide Interoperability for Microwave Access
Extended Coverage: The general principle of extended coverage is that of using blind transmissions for the control channels and for the data channels to realize a target block error rate performance (BLER) for the channel of interest. In addition, for the data channels the use of blind transmissions assuming MCS-1 (i.e., the lowest modulation and coding scheme (MCS) supported in EGPRS today) is combined with HARQ retransmissions to realize the needed level of data transmission performance. Support for extended coverage is realized by defining different coverage classes. A different number of blind transmissions are associated with each of the coverage classes wherein extended coverage is associated with coverage classes for which multiple blind transmissions are needed (i.e., a single blind transmission is considered as the reference coverage). The number of total blind transmissions for a given coverage class can differ between different logical channels.

Timing Advance Information: Identifies the timing advance value a BSS determines to be applicable to the mobile station in the cell where it has performed the MTA procedure and is part of the MTA related measurement information passed from the BSS to the SMLC during the MTA procedure. When the RLC Data Block method or Extended Access Burst method is used for performing the MTA procedure (see 43.059 Draft Change Request (CR) (Rel-14) v13.2.0, "Introduction of Multilateration," Source: Ericsson LM, RAN WG6 telco #1 on ePOS_GERAN, dated Dec. 15, 2016—the contents of which are hereby incorporated herein by reference for all purposes), the timing advance value estimated by the BSS may be adjusted according to the "MS Transmission Offset" value extracted from the RLC Data Block or the Extended Access Burst (see "Analysis of MS Transmission Accuracy", Source: Ericsson LM, RAN WG6 telco #1 on ePOS_GERAN, dated Dec. 15, 2016—the contents of which are hereby incorporated herein by reference for all purposes) prior to the timing advance value being forwarded by the BSS to the SMLC. Alternatively, the "MS Transmission Offset" value may be sent to the SMLC along with the corresponding non-adjusted timing advance value wherein the SMLC is then responsible for performing the adjustment.

At the 3rd-Generation Partnership Project (3GPP) Technical Specification Group (TSG) Radio Access Network (RAN) Meeting #72, a Work Item on "Positioning Enhancements for GERAN" was approved (see RP-161260; Busan, Korea; 13-16 Jun. 2016—the contents of which are hereby incorporated herein by reference for all purposes), wherein one candidate method for realizing improved accuracy when determining the position of a mobile station (MS) is multi-lateration timing advance (MTA) (see RP-161034; Busan, Korea; 13-16 Jun. 2016—the contents of which are hereby incorporated herein by reference for all purposes), which relies on establishing the MS position based on Timing Advance (TA) values in multiple cells.

At the 3GPP TSG-RAN1 Meeting #86, a proposal based on a similar approach was made also to support positioning of Narrow Band Internet of Things (NB-IoT) mobiles (see R1-167426; entitled "On timing advance based multi-leg positioning for NB-IoT;" Source: Ericsson LM; Gothenburg, Sweden; 22-26 Aug. 2016—the contents of which are hereby incorporated herein by reference for all purposes). In regards to IoT devices, it expected that in a near future, the population of Cellular IoT devices will be very large. Various predictions exist; one such prediction is that there will be >60000 cellular IoT devices per square kilometer (see draft CR 43.059 entitled "Introduction of Multilateration", Source Ericsson LM, RAN WG6 telco #1 on ePOS_GERAN, dated: Dec. 15, 2016—the contents of which are hereby incorporated herein by reference for all purposes), and another prediction is that there will be 1000000 cellular IoT devices per square kilometer (see R1-167426; entitled "On timing advance based multi-leg positioning for NB-IoT;" Source: Ericsson LM; Gothenburg, Sweden; 22-26 Aug. 2016—the contents of which are hereby incorporated herein by reference for all purposes). A large fraction of these cellular IoT devices are expected to be stationary, e.g., gas and electricity meters, vending machines, etc. . . . . . Extended Coverage GSM-IoT (EC-GSM-IoT) and NB-IoT are two standards for Cellular IoT that have been specified by 3GPP TSG GERAN and TSG Radio Access Network (RAN).

Timing Advance (TA) is a measure of the propagation delay between a base transceiver station (BTS) and the MS, and since the speed by which radio waves travel is known, the distance between the BTS and the MS can be derived. Further, if the TA applicable to the MS is measured within multiple BTSs and the positions (i.e., longitude and latitude) of these BTSs are known, the position of the MS can be derived using the measured TA values. The measurement of the TA requires that the MS synchronize to each neighbor BTS and transmit a signal time-aligned with the timing of the BTS estimated by the MS. The BTS measures the time difference between its own time reference, and the timing of the received signal (transmitted by the MS). This time difference is equal to two times the propagation delay between the BTS and the MS (one propagation delay of the BTS's synchronization signal sent to the MS, plus one equal propagation delay of the signal transmitted by the MS back to the BTS).

As shown in FIG. 1 (PRIOR ART), once a set of TA values $TA_1$, $TA_2$, and $TA_3$ are established using a set of one or more BTSs $102_1$, $102_2$, $102_3$ (only three shown) during a given positioning procedure, the position of the MS 104 can be derived through a so called Multilateration Timing Advance (MTA) procedure wherein the position of the MS 104 is determined by the intersection of a set of hyperbolic curves $106_1$, $106_2$, $106_3$ associated with each BTS $102_1$, $102_2$, $102_3$. The calculation of the position of the MS 104 is typically carried out by a serving positioning node 110 (e.g., serving Serving Mobile Location Center 110 (SMLC 110)), which implies that all of the derived TA values $TA_1$, $TA_2$, and $TA_3$ and the associated position information of the BTSs $102_1$, $102_2$, $102_3$ needs to be sent to the serving positioning node 110 (i.e., the serving SMLC 110) which initiated the positioning procedure. In this example, the BTSs $102_1$, $102_2$, $102_3$ transmit their respective $TA_1$, $TA_2$, and $TA_3$ to one BSS 108 which then transmits $TA_1$, $TA_2$, and $TA_3$ to the SMLC 110. The BSS 108 and SMLC 110 are both connected to a SGSN 112. It should be appreciated that each BTS $102_1$, $102_2$, $102_3$ could also be connected to different BSSs (not shown) where in any configuration the SMLC 110 is still provided with the calculated $TA_1$, $TA_2$, and $TA_3$.

At the 3GPP TSG-RANG Meeting #3, some enhancements to the procedure have been proposed wherein the Base Station System (BSS) 108 estimates with sufficient accuracy the Timing Advance value in the serving cell during the initiation of the Multilateration Timing Advance procedure. Referring to FIGS. 2A-2B (PRIOR ART), there is a signal diagram which illustrates one of the proposed enhancements for allowing the BSS 108 to estimate the Timing Advance value in the serving cell during the initiation of the Multilateration Timing Advance procedure. This proposed enhancement consists of introducing a new (EC-) Packet Channel Request message 202 in step 3 with an indication that the MS 104 is responding to a paging request for positioning 204 from step 1. This allows the BSS 108 to use more advanced Timing Advance estimation algorithms such as oversampling and interpolation during the reception of the subsequent Radio Link Control (RLC) data block 206 (last step in step 3) containing the Logical Link Control (LLC) Protocol Data Unit (PDU) 208 and mobile station accuracy information 210. At the 3GPP TSG-RANG Meeting #3 it has also been proposed (but no solutions presented) that in step 11 the BSS 108 should also be able to estimate the Timing Advance value 212 in the serving cell on reception of the (Extended Coverage-) Packet Associated Control Channel ((EC-)PACCH) Packet Downlink Ack 214. Then, the BSS 108 could send at step 12 the estimated timing advance 212 (note: the estimated timing advance 212 is adjusted according to a "MS Transmission Offset" that the BSS 108 receives from the MS 104 in the (EC-)PACCH Packet Downlink Ack 214, see the definition of "Timing Advance Information" above) along with BTS receiver accuracy and MS accuracy parameters (shown as MS accuracy information 216) to the SMLC 110 to update the serving cell related timing estimation, thereby allowing the MS 104 to leave the serving cell to perform the Multilateration Timing Advance procedure in additional cells without first performing the Multilateration Timing Advance procedure in the serving cell (note: the BTS receiver accuracy is passed to the SMLC 110 as part of the MS accuracy information 216 and is information that the BSS 108 is able to self-generate (i.e., the BTS receiver accuracy portion of the MS accuracy information 216 is not passed from the wireless device 104 to the BSS 108)). The present disclosure describes why the BSS 108 cannot perform steps 11-12 and then discloses a solution such that when implemented the BSS 108 can perform steps 11-12.

SUMMARY

A SGSN, a BSS, a wireless device, and various methods for addressing the aforementioned problems are described in the independent claims. Advantageous embodiments of the SGSN, the BSS, wireless device, and the various methods are further described in the dependent claims.

In one aspect, the present disclosure provides a SGSN configured to interact with a BSS. The SGSN comprises a processor and a memory that stores processor-executable instructions, wherein the processor interfaces with the memory to execute the processor-executable instructions, whereby the SGSN is operable to perform a receive operation, and a transmit operation. In the receive operation, the SGSN receives, from the BSS, a BSSGP POSITION-COMMAND PDU which includes (i) a RRLP PDU, wherein the RRLP PDU includes a RRLP MTA Request message intended for a target wireless device, and (ii) an indicator that the target wireless device is to perform a MTA procedure. In the transmit operation, the SGSN transmits, to the BSS, a BSSGP DL-UNITDATA PDU which includes a LLC PDU intended for the target wireless device, wherein the LLC PDU includes the RRLP PDU, wherein the RRLP PDU further includes the RRLP MTA Request Message, wherein the BSSGP DL-UNITDATA PDU further includes a flag which indicates to the BSS a need to estimate timing advance information when receiving a PACCH acknowledgment from the target wireless device. An exemplary advantage of the SGSN implementing these operations is that the BSS is informed that it is to estimate timing advance information when receiving a PACCH acknowledgment from the wireless device after the BSS transmits the LLC PDU to the wireless device.

In another aspect, the present disclosure provides a method in a SGSN configured to interact with a BSS. The method comprises a receiving step, and a transmitting step. In the receiving step, the SGSN receives, from the BSS, a BSSGP POSITION-COMMAND PDU which includes a RRLP PDU, wherein the RRLP PDU includes (i) a RRLP MTA Request message intended for a target wireless device, and (ii) an indicator that the target wireless device is to perform a MTA procedure. In the transmitting step, the SGSN transmits, to the BSS, a BSSGP DL-UNITDATA PDU which includes a LLC PDU intended for the target wireless device, wherein the LLC PDU includes the RRLP PDU, wherein the RRLP PDU further includes the RRLP MTA Request Message, wherein the BSSGP DL-UNITDATA PDU further includes a flag which indicates to the BSS a need to estimate timing advance information when receiving a PACCH acknowledgment from the target wireless device. An exemplary advantage of the SGSN implementing these steps is that the BSS is informed that it is to estimate timing advance information when receiving a PACCH acknowledgment from the wireless device after the BSS transmits the LLC PDU to the wireless device.

In yet another aspect, the present disclosure provides a BSS configured to interact with a SGSN and a target wireless device. The BSS further comprises a processor and a memory that stores processor-executable instructions, wherein the processor interfaces with the memory to execute the processor-executable instructions, whereby the BSS is operable to perform a first transmit operation, a first receive operation, a second transmit operation, a second receive operation, and an estimate operation. In the first transmit operation, the BSS transmits, to the SGSN, a BSSGP POSITION-COMMAND PDU which includes (i) a RRLP PDU, wherein the RRLP PDU includes a RRLP MTA Request message intended for the target wireless device, and (ii) an indicator that the target wireless device is to perform a MTA procedure. In the first receive operation, the BSS receives, from the SGSN, a BSSGP DL-UNITDATA PDU which includes a LLC PDU intended for the target wireless device, wherein the LLC PDU includes the RRLP PDU, wherein the RRLP PDU further includes the RRLP MTA Request Message. In the second transmit operation, the BSS transmits, to the target wireless device, the LLC PDU which includes the RRLP PDU which further includes the RRLP MTA Request Message. In the second receive operation, the BSS in response to transmitting the LLC PDU receives a PACCH acknowledgment from the target wireless device. In the estimate operation, the BSS when receiving the PACCH acknowledgment estimates timing advance information associated with the PACCH acknowledgment, wherein the BSS is informed of a need to estimate the timing advance information when receiving the PACCH acknowledgment by a flag within the BSSGP DL-UNITDATA PDU. An exemplary advantage of the BSS implementing these operations is that the BSS is informed that it is to estimate timing advance information when receiving a PACCH acknowledgment from the wireless device after the BSS transmits the LLC PDU to the wireless device.

In still yet another aspect, the present disclosure provides a method in a BSS configured to interact with a SGSN and a target wireless device. The method comprises a first transmitting step, a first receiving step, a second transmitting step, a second receiving step, and an estimating step. In the first transmitting step, the BSS transmits, to the SGSN, a BSSGP POSITION-COMMAND PDU which includes (i) a RRLP PDU, wherein the RRLP PDU includes a RRLP MTA Request message intended for the target wireless device, and (ii) an indicator that the target wireless device is to perform a MTA procedure. In the first receiving step, the BSS receives, from the SGSN, a BSSGP DL-UNITDATA PDU which includes a LLC PDU intended for the target wireless device, wherein the LLC PDU includes the RRLP PDU, wherein the RRLP PDU further includes the RRLP MTA Request Message. In the second transmitting step, the BSS transmits, to the target wireless device, the LLC PDU which includes the RRLP PDU which further includes the RRLP MTA Request Message. In the second receiving step, the BSS in response to transmitting the LLC PDU receives a PACCH acknowledgment from the target wireless device. In the estimating step, the BSS when receiving the PACCH acknowledgment estimates timing advance information associated with the PACCH acknowledgment, wherein the BSS is informed of a need to estimate the timing advance information when receiving the PACCH acknowledgment by a flag within the BSSGP DL-UNITDATA PDU. An exemplary advantage of the BSS implementing these steps is that the BSS is informed that it is to estimate timing advance information when receiving PACCH acknowledgment from the wireless device after the BSS transmits the LLC PDU to the wireless device.

In another aspect, the present disclosure provides a wireless device configured to interact with a BSS. The wireless device comprises a processor and a memory that stores processor-executable instructions, wherein the processor interfaces with the memory to execute the processor-executable instructions, whereby the wireless device is operable to perform a receive operation, and a transmit operation. In the receive operation, the wireless device receives, from the BSS, a LLC PDU, wherein the LLC PDU includes a RRLP PDU, wherein the RRLP PDU further includes a RRLP MTA Message which indicates that the wireless device does not need to perform a MTA procedure in a serving cell (i.e., the cell in which the wireless device receives the RRLP MTA Message). In the transmit operation, the wireless device in response to receiving the LLC PDU, transmits a PACCH acknowledgment to the BSS. An exemplary advantage of the wireless device implementing these operations is that the wireless device reduces its battery consumption because the wireless device does not need to perform the MTA procedure in the serving cell.

In yet another aspect, the present disclosure provides a method in a wireless device configured to interact with a BSS. The method comprises a receiving step, and a transmitting step. In the receiving step, the wireless device receives, from the BSS, a LLC PDU, wherein the LLC PDU includes a RRLP PDU, wherein the RRLP PDU further includes a RRLP MTA Request Message which indicates that the wireless device does not need to perform a MTA procedure in a serving cell (i.e., the cell in which the wireless device receives the RRLP MTA Message). In the transmitting step, the wireless device in response to receiving the LLC PDU, transmits a PACCH acknowledgment to the BSS. An exemplary advantage of the wireless device implementing these steps is that the wireless device reduces its battery consumption because the wireless device does not need to perform the MTA procedure in the serving cell.

Additional aspects of the present disclosure will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the present disclosure.

BRIEF DESCRIPTION OF THE DRAWINGS

A more complete understanding of the present disclosure may be obtained by reference to the following detailed description when taken in conjunction with the accompanying drawings:

FIGS. 4A-4B are an illustration of a Multilateration Positioning procedure for determining a position of a wireless device in accordance with an embodiment of the present disclosure;

FIGS. 5A-5B illustrate the contents of a BSSGP DL-UNITDATA PDU with a Message Indicator Information Element in accordance with an embodiment of the present disclosure;

FIG. 6 is a diagram illustrating one possible coding of the Message Indicator Information Element in accordance with an embodiment of the present disclosure;

FIG. 7 is a diagram illustrating one possible coding of a Message Indicator Field in the Message Indicator Information Element shown in FIG. 6 in accordance with an embodiment of the present disclosure;

FIG. 8 is a diagram that illustrates the content of a BSSGP POSITION-COMMAND PDU modified to include a Multilateration Timer Information Element (IE) in accordance with an embodiment of the present disclosure;

DETAILED DESCRIPTION

Figure 3:
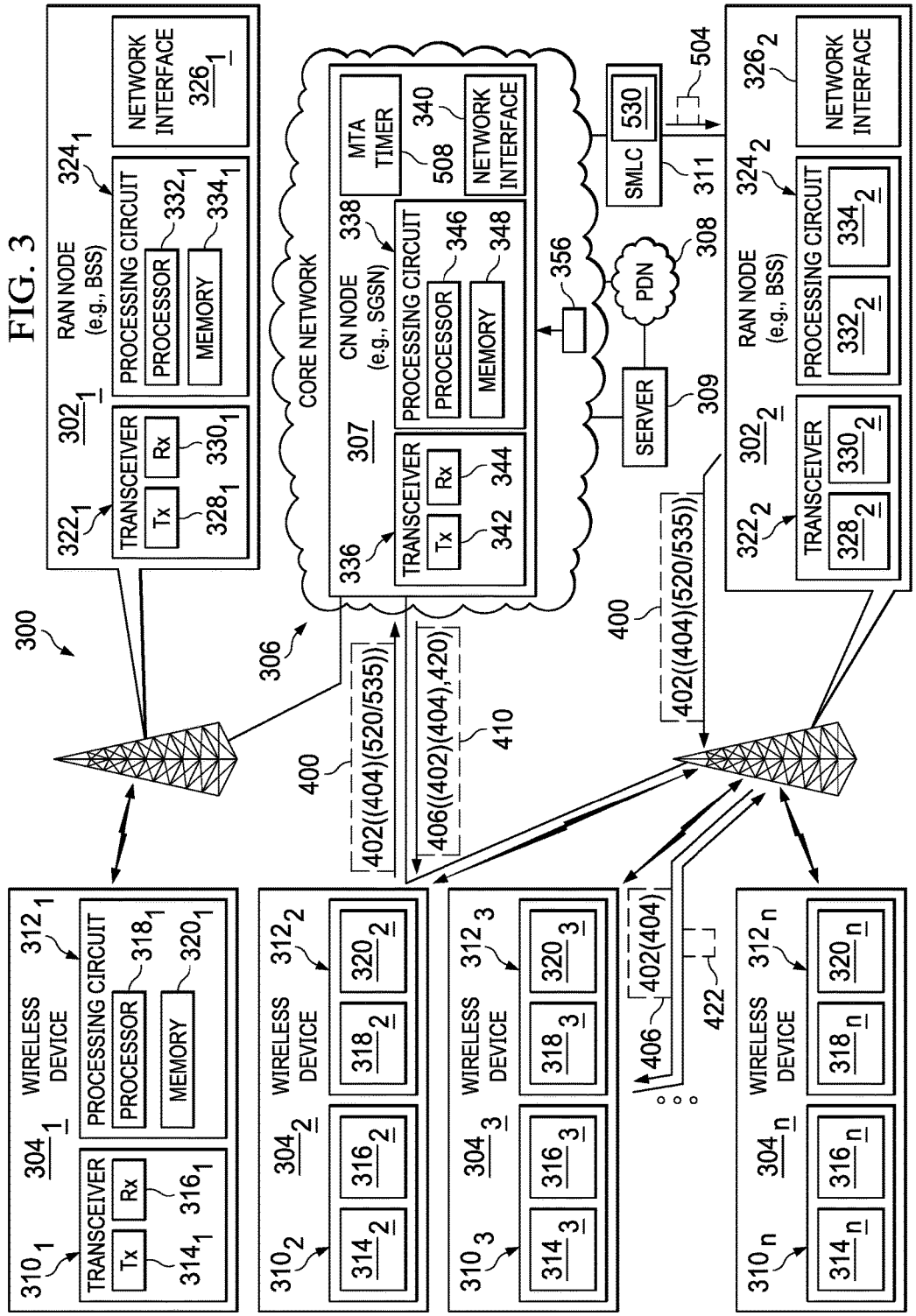
FIG. 3 is a diagram of an exemplary wireless communication network which includes a SGSN, multiple BSSs, and multiple wireless devices which are configured in accordance with an embodiment of the present disclosure.

A discussion is provided first herein to describe an exemplary wireless communication network that includes a CN node (e.g., SGSN, MME), multiple RAN nodes (e.g., BSSs, NodeBs, eNodeBs), and multiple wireless devices (e.g., mobile stations, IoT devices) in accordance with an embodiment of the present disclosure (see FIG. 3). Then, a discussion is provided to disclose various techniques that the CN node (e.g., SGSN, MME), the RAN node (e.g., BSS, NodeB, eNodeB), and the wireless device can implement such that the RAN node is able to estimate a Timing Advance value for the serving cell of the wireless device upon receipt of an acknowledgment message (e.g., PACCH acknowledgment, EC-PACCH acknowledgment from the wireless device (see FIGS. 4A-10). Thereafter, a discussion is provided to explain the basic functionalities-configurations of the CN node (e.g., SGSN, MME), the RAN node (e.g., BSS, NodeB, eNodeB), and the wireless device in accordance with different embodiments of the present disclosure (see FIGS. 11-16).

Exemplary Wireless Communication Network 300

Referring to FIG. 3, there is illustrated an exemplary wireless communication network 300 in accordance with the present disclosure. The wireless communication network 300 includes a core network 306 (which comprises at least one CN node 307) and multiple RAN nodes 302$_1$ and 302$_2$ (only two shown) which interface with multiple wireless devices 304$_1$, 304$_2$, 304$_3$ . . . 304$_n$. The wireless communication network 300 also includes many well-known components, but for clarity, only the components needed to describe the features of the present disclosure are described herein. Further, the wireless communication network 300 is described herein as being a GSM/EGPRS wireless communication network 300 which is also known as an EDGE wireless communication network 300. However, those skilled in the art will readily appreciate that the techniques of the present disclosure which are applied to the GSM/EGPRS wireless communication network 300 are generally applicable to other types of wireless communication systems, including, for example, WCDMA, LTE, and WiMAX systems.

The wireless communication network 300 includes the RAN nodes 302$_1$ and 302$_2$ (wireless access nodes—only two shown) which provide network access to the wireless devices 304$_1$, 304$_2$, 304$_3$ . . . 304$_n$. In this example, the RAN node 302$_1$ is providing network access to wireless device 304$_1$ while the RAN node 302$_2$ is providing network access to wireless devices $304_2$, $304_3$ ... $304_n$. The RAN nodes $302_1$ and $302_2$ are connected to the core network 306 (e.g., SGSN core network 306) and, in particular, to the CN node 307 (e.g., SGSN 307). The core network 306 is connected to an external packet data network (PDN) 308, such as the Internet, and a server 310 (only one shown). The wireless devices $304_1$, $304_2$, $304_3$ ... $304_n$ may communicate with one or more servers 309 (only one shown) connected to the core network 306 and/or the PDN 308. In this example, the RAN node $302_2$ and the CN node 307 are both connected to a positioning server 311 (e.g., Serving Mobile Location Center 311). The other RAN node $302_2$ can be connected to the same positioning server 311 (e.g., Serving Mobile Location Center 311) or to a different positioning server 311 (e.g., Serving Mobile Location Center 311).

The wireless devices $304_1$, $304_2$, $304_3$ ... $304_n$ may refer generally to an end terminal (user) that attaches to the wireless communication network 300, and may refer to either a MTC device (e.g., a smart meter) or a non-MTC device. Further, the term "wireless device" is generally intended to be synonymous with the term mobile device, mobile station (MS). "User Equipment," or UE, as that term is used by 3GPP, and includes standalone wireless devices, such as terminals, cell phones, smart phones, tablets, cellular IoT devices, IoT devices, and wireless-equipped personal digital assistants, as well as wireless cards or modules that are designed for attachment to or insertion into another electronic device, such as a personal computer, electrical meter, etc.

Likewise, unless the context clearly indicates otherwise, the term RAN node $302_1$ and $302_2$ (wireless access node $302_1$ and $302_2$) is used herein in the most general sense to refer to a base station subsystem (BSS), a wireless access node, or a wireless access point in a wireless communication network 300, and may refer to RAN nodes $302_1$ and $302_2$ that are controlled by a physically distinct radio network controller as well as to more autonomous access points, such as the so-called evolved Node Bs (eNodeBs) in Long-Term Evolution (LTE) networks.

Each wireless device $304_1$, $304_2$, $304_3$ ... $304_n$ may include a transceiver circuit $310_1$, $310_2$, $310_3$ ... $310_n$ for communicating with the RAN nodes $302_1$ and $302_2$, and a processing circuit $312_1$, $312_2$, $312_3$ ... $312_n$ for processing signals transmitted from and received by the transceiver circuit $310_1$, $310_2$, $310_3$ ... $310_n$ and for controlling the operation of the corresponding wireless device $304_1$, $304_2$, $304_3$ ... $304_n$. The transceiver circuit $310_1$, $310_2$, $310_3$ ... $310_n$ may include a transmitter $314_1$, $314_2$, $314_3$ ... $314_n$ and a receiver $316_1$, $316_2$, $316_3$ ... $316_n$, which may operate according to any standard, e.g., the GSM/EDGE standard. The processing circuit $312_1$, $312_2$, $312_3$ ... $312_n$ may include a processor $318_1$, $318_2$, $318_3$ ... $318_n$ and a memory $320_1$, $320_2$, $320_3$ ... $320_n$ for storing program code for controlling the operation of the corresponding wireless device $304_1$, $304_2$, $304_3$ ... $304_n$. The program code may include code for performing the procedures as described hereinafter.

Each RAN node $302_1$ and $302_2$ (BSS $302_1$ and $302_2$) may include a transceiver circuit $322_1$ and $322_2$ for communicating with wireless devices $304_1$, $304_2$, $304_3$ ... $304_n$, a processing circuit $324_1$ and $324_2$ for processing signals transmitted from and received by the transceiver circuit $322_1$ and $322_2$ and for controlling the operation of the corresponding RAN node $302_1$ and $302_2$, and a network interface $326_1$ and $326_2$ for communicating with the core network 306. The transceiver circuit $322_1$ and $322_2$ may include a transmitter $328_1$ and $328_2$ and a receiver $330_1$ and $330_2$, which may operate according to any standard, e.g., the GSM/EDGE standard. The processing circuit $324_1$ and $324_2$ may include a processor $332_1$ and $332_2$, and a memory $334_1$ and $334_2$ for storing program code for controlling the operation of the corresponding RAN node $302_1$ and $302_2$. The program code may include code for performing the procedures as described hereinafter.

The CN node 307 (e.g., SGSN 307, MME 307) may include a transceiver circuit 336 for communicating with the RAN nodes $302_1$ and $302_2$, a processing circuit 338 for processing signals transmitted from and received by the transceiver circuit 336 and for controlling the operation of the CN node 307, and a network interface 340 for communicating with the RAN nodes $302_1$ and $302_2$. The transceiver circuit 336 may include a transmitter 342 and a receiver 344, which may operate according to any standard, e.g., the GSM/EDGE standard. The processing circuit 338 may include a processor 346 and a memory 348 for storing program code for controlling the operation of the CN node 307. The program code may include code for performing the procedures as described hereinafter.

Figure 1:
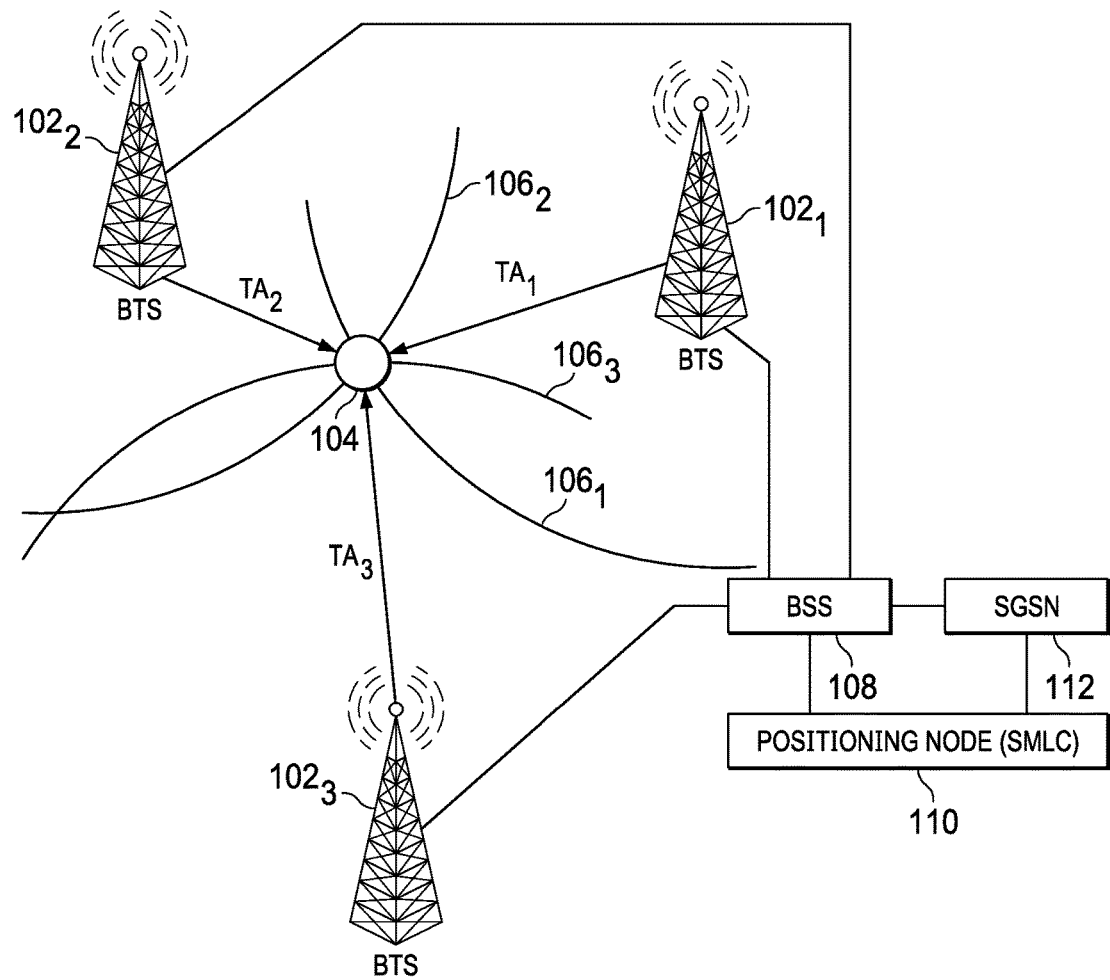
FIG. 1 (PRIOR ART) is a diagram illustrating a Multilateration process involving three base transceiver stations associated with three timing advance (TA) values for a particular wireless device.
Figure 2A:
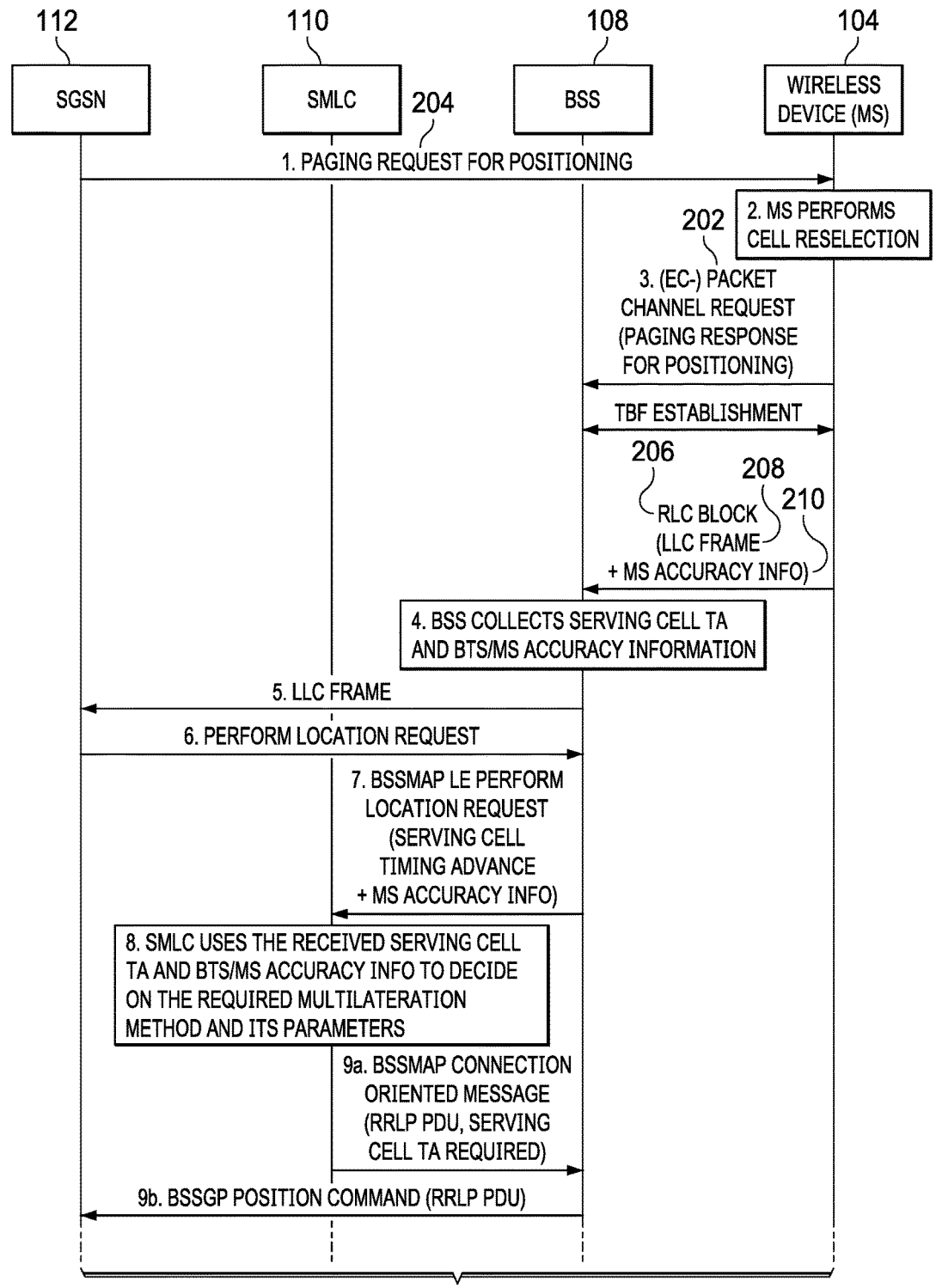
FIGS. 2A-2B (PRIOR ART) are an illustration of a Multilateration procedure for determining a position of a wireless device.
Figure 2B:
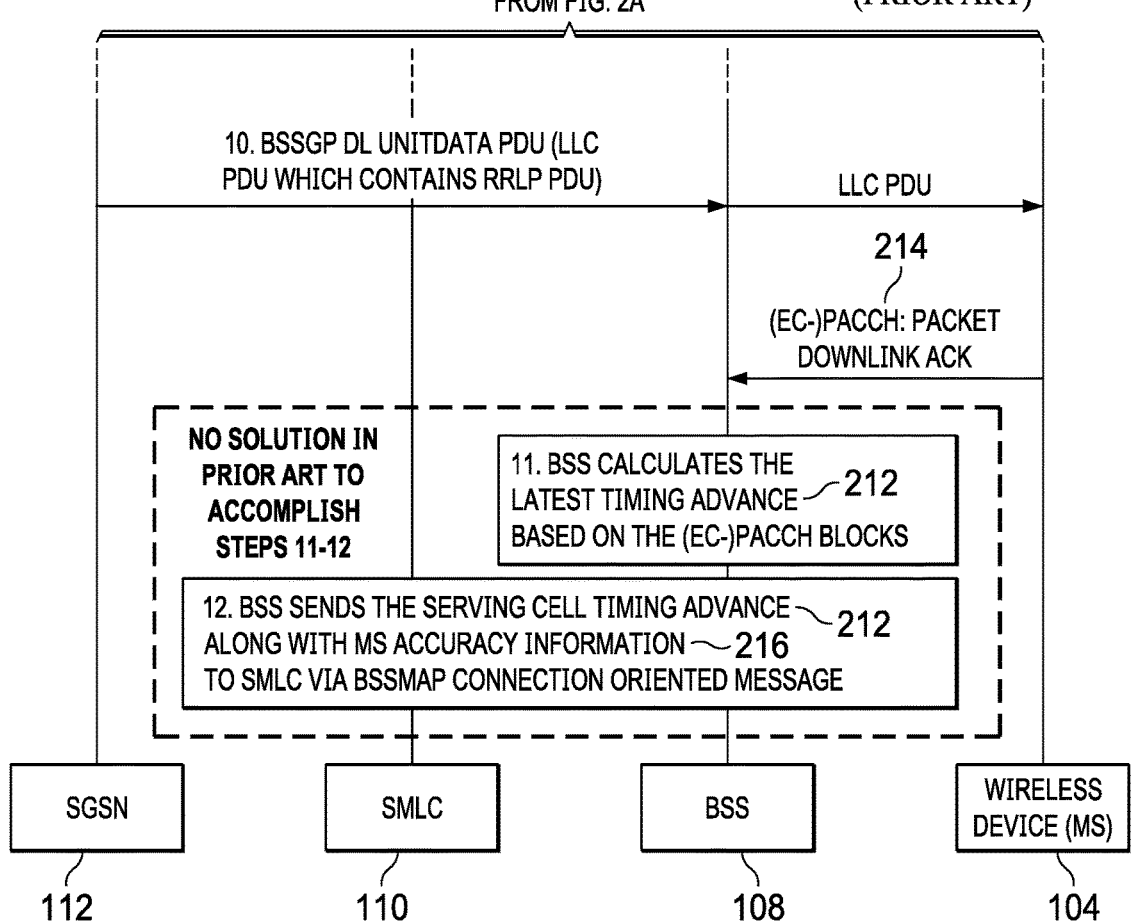

Techniques for Enabling the RAN Node $302_2$ (for Example) to Estimate a Timing Advance Value As discussed in the Background Section, at the 3GPP TSG-RAN6 Meeting #3 it had been proposed (but no solutions presented) that in FIG. 2B's step 11 the BSS 108 should also be able to estimate the Timing Advance value 212 in the serving cell on reception of the (Extended Coverage-) Packet Associated Control Channel ((EC-) PACCH) Packet Downlink Ack 214. Then, the BSS 108 could send at FIG. 2B's step 12 the estimated timing advance 212 along with the BTS receiver accuracy and MS accuracy parameters (shown as MS accuracy information 216) to the SMLC 110 to update the serving cell related timing estimation, thereby allowing the MS 104 to leave the serving cell to perform the Multilateration Timing Advance procedure in additional cells without first performing the Multilateration Timing Advance procedure in the serving cell (recall: that the BTS receiver accuracy that is passed to the SMLC 110 as part of the MS accuracy information 216 is information that the BSS 108 is able to self-generate (i.e., the BTS receiver accuracy portion of the MS accuracy information 216 is not passed from the wireless device 104 to the BSS 108)). As discussed below, the inventors have determined why FIG. 2's steps 11-12 was not possible in the past and also have determined various techniques that when implemented enable the BSS to perform FIG. 2B's steps 11-12.

The problem with the prior art process can be seen with reference to FIG. 2B's step 10 where the triggering RRLP PDU (which contains a RRLP MTA Request message) transmitted by the SGSN 112 to the BSS 108 is in an LLC PDU which is inside a BSSGP DL-UNITDATA PDU, however the LLC PDU (which contains the RRLP PDU which contains the RRLP MTA Request message) is sent transparently through the BSS 108 to the MS 104. Hence, the BSS 108 which transparently sent the LLC PDU (which contains the RRLP PDU which contains the RRLP MTA Request message) over the radio interface to the wireless device in FIG. 2B's step 10 will not know that it should use algorithms (e.g., enhanced algorithms such as oversampling and interpolation) for estimating the Timing Advance value upon receiving one or more (EC-) PACCH Packet Downlink Ack messages from the wireless device in FIG. 2B's step 11. The various techniques that can address this problem are discussed next.

Figure 4A:
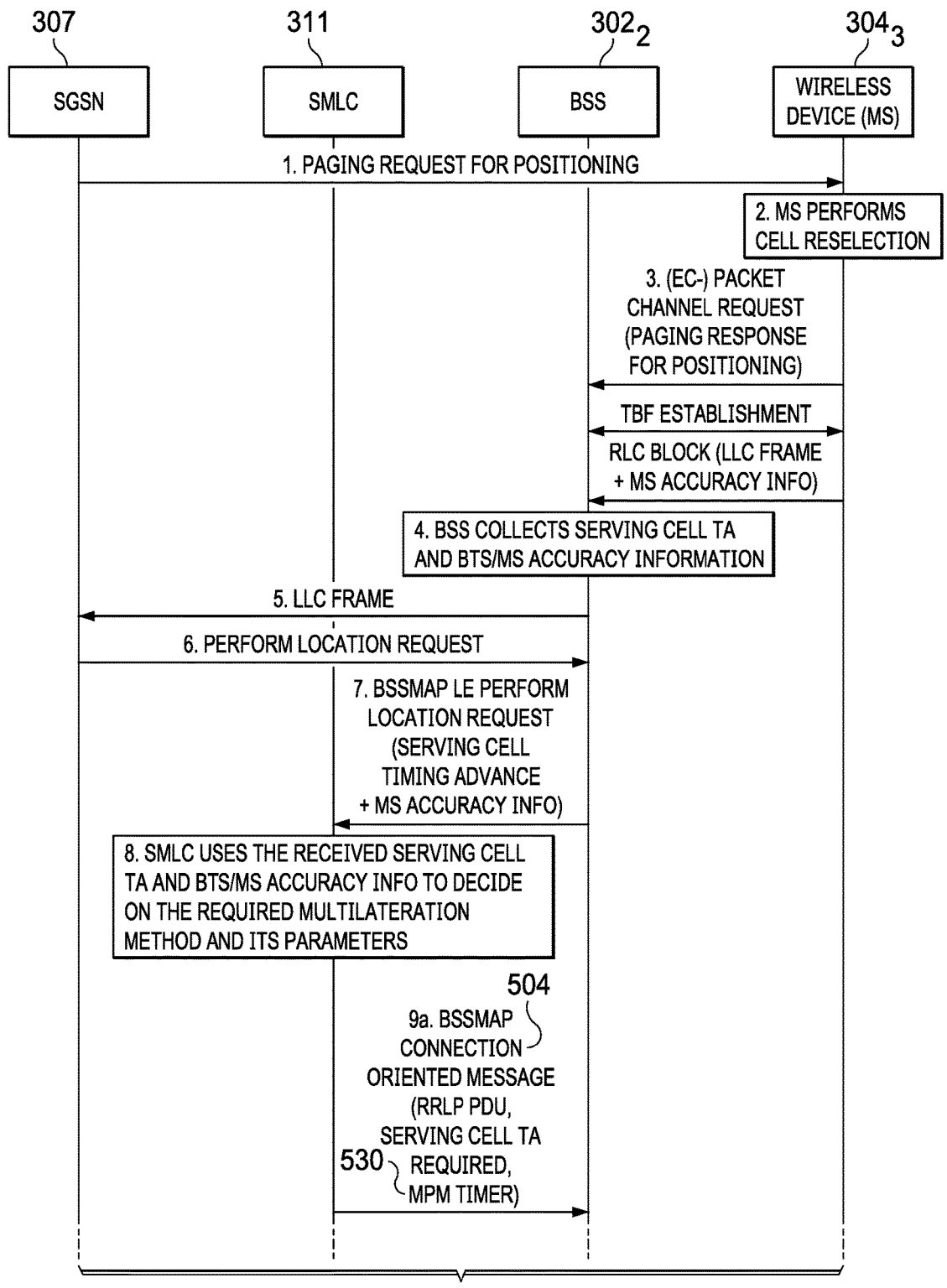

In the present disclosure with reference to FIGS. 4A-4B, the SGSN 307 upon receiving a BSSGP POSITION-COM- MAND PDU 400 from the BSS 302₂ in FIG. 4B's step 9b is aware that it has been requested to forward a RRLP PDU 402 (containing a RRLP MTA Request message 404) to the wireless device 304₃ (for example) because an indicator 520, 535 that the target wireless device 304₃ is to perform a MTA procedure is also included in the BSSGP POSITION-COMMAND PDU 400 (note: this new indicator 520, 535 is discussed in more detail below). Then, the SGSN 307 maps the RRLP PDU 402 (containing the RRLP MTA Request message 404) into an LLC PDU 406 and forwards the LLC PDU 406 (containing the RRLP PDU 402 which contains the RRLP MTA Request message 404) to the same BSS 302₂ using a BSSGP DL-UNITDATA PDU 410 as shown in FIG. 4B's step 10. The BSS 302₂ then relays the LLC PDU 406 (containing the RRLP PDU 402 which contains the RRLP MTA Request message 404) to the target wireless device 304₃ over the radio interface. To ensure that the BSS 302₂ is aware that the received BSSGP DL-UNITDATA PDU 410 contains the RRLP PDU 402 (containing the RRLP MTA Request message 404) inside the LLC PDU 406, it is proposed to enhance the BSSGP DL-UNITDATA PDU 410 with a flag 420 that provides this indication. The flag 420 may be:

- a new Information Element (IE) 420a (referred to herein as Message Indicator IE 420a) within the BSSGP DL-UNITDATA PDU 410 or,
- a spare code point in some other legacy IE within the BSSGP DL-UNITDATA PDU 410.

The BSS 302₂ upon reception of the enhanced BSSGP DL-UNITDATA PDU 410 containing the new flag 420 can estimate the serving cell's Timing Advance by invoking advanced Timing Advance estimation algorithms such as oversampling and interpolation on the one or more PACCH Packet Downlink Acks 422 ((EC-)PACCH Packet Downlink Acks 422) received from the wireless device 304₃ after sending the wireless device 304₃ the LLC PDU 406 (containing the RRLP PDU 402 which contains the RRLP MTA Request message 404) using a downlink Temporary Block Flow (TBF) (EC-TBF)(see FIG. 4B's step 11). It should be appreciated that the BSS 302₂ sends the wireless device 304₃ an EC Downlink Assignment message to establish a downlink TBF which is then used to deliver the LLC PDU 406 to the wireless device 304₃. When the EC Downlink Assignment message includes the "Multilateration Information Request" IE (see section 9.1.64 of 3GPP TS 44.018 v14.0.0 dated Dec. 23, 2016—the contents of which are incorporated herein by reference for all purposes) it serves to inform the wireless device 304₃ that it is to include "MS Transmission Offset" and "MS Sync Accuracy" information in the one or more PACCH acknowledgments 422 that the wireless device 304₃ sends in response to receiving the LLC PDU 406, i.e., even though the BSS 302₂ is informed of a need to estimate the timing advance information using advanced procedures by the flag 420 within the BSSGP DL-UNITDATA PDU 410 per FIG. 4B's step 10, the BSS 302₂ will not be able to actually perform the advanced procedures unless it first uses the "Multilateration Information Request" IE to tell the wireless device 304₃ to include "MS Transmission Offset" and "MS Sync Accuracy" information in the one or more PACCH acknowledgments 422 (note: the inclusion of the "Multilateration Information Request" IE in the EC Downlink Assignment is covered by prior art). Thereafter, the BSS 302₂ sends the estimated serving cell's Timing Advance along with the Accuracy Information 415 to the SMLC 311 via a BSSMAP Connection Oriented Message 424 (see FIG. 4B's step 12) (note: the BSSMAP Connection Oriented Message 424 may also indentify the BTS that received the Packet Associated Control Channel (PACCH) acknowledgment 422 from the target wireless device 304₃).

In one embodiment, to ensure that the BSS 302₂ is aware that the BSSGP DL-UNITDATA PDU 410 contains a RRLP PDU 402 (which contains a RRLP Multilateration Timing Advance Request message 404) inside an LLC PDU 406, it has been proposed to add the aforementioned new information element 420a referred to herein as the Message Indicator IE 420a to the BSSGP DL-UNITDATA PDU 410. FIGS. 5A-5B are a table illustrating the content of the BSSGP DL-UNITDATA PDU 410 which includes the legacy IEs (e.g., the LLC PDU 406) and the new Message Indicator 420a (note: this table including the new Message Indicator 420a and the associated note 16 or similar could be added to the 3GPP TS 48.018). FIG. 6 is a diagram illustrating an exemplary coding of the Message Indicator IE 420a. FIG. 7 is a diagram illustrating an exemplary coding of a message indicator field 424 (octet 3) in the Message Indicator IE 420a where the message indicator 424 will specifically indicate to the BSS 302₂ that a RRLP Multilateration Timing Advance Request message 404 is included inside the LLC PDU 406. It should also be noted that through the introduction of a more generic field like the Message Indicator field 424, that this generic field may be used to indicate the inclusion of any other higher layer message through the use of remaining available code points. For example, if there is a new positioning method for which it will be beneficial for a BSS 302₂ (for example), when relaying a LLC PDU 406 (containing a RRLP message) to a target wireless device 304₃ for that new positioning method, to be made aware of then this can be accomplished by using the new Message Indicator field 424 described in the present disclosure.

The SGSN 307 needs to know that the target wireless device 304₃ is being requested to perform a MTA positioning procedure before the SGSN 307 is able to generate and transmit the BSSGP DL-UNITDATA PDU 410 which includes (i) the LLC PDU 406 (which includes the RRLP PDU 402 which includes the RRLP MTA Request message 404), and (ii) the flag 420 which indicates to the BSS 302₂ that it needs to estimate TA information 413 when receiving a PACCH acknowledgment 422 from the target wireless device 304₃ (see FIG. 4B's step 10). To ensure that the SGSN 307 knows that the target wireless device 304₃ is being requested to perform a MTA positioning procedure (and not some other positioning procedure) so that the SGSN 307 can then transmit the BSSGP DL-UNITDATA PDU 410 to the BSS 302₂ the following can be done: the BSS 302₂ can send the SGSN 307 a BSSGP POSITION-COMMAND PDU 400 which not only includes the RRLP PDU 402 (containing the RRLP MTA Request message 404) but also includes an indicator 520, 535 that the target wireless device 304₃ is to perform a MTA procedure (see FIG. 4B's step 9b). In particular, the BSS 302₂ can use any one of several different techniques to generate this BSSGP POSITION-COMMAND PDU 400 which contains the indication 520, 535 (which can be in the form of a flag or a timer) that a given wireless device 304₃ (for example) is going perform the MTA procedure. These exemplary several different techniques are discussed in detail in more detail below.

In a first technique, to ensure that the SGSN 307 is aware that a RRLP MTA Request message 404 is being sent to a given wireless device 304₃ (for example), the BSSGP POSITION-COMMAND PDU 400 sent by the BSS 302₂ to the SGSN 307 is enhanced with a new Multilateration Timer IE 520 that provides the SGSN 307 with an indication 522 that the BSSGP POSITION-COMMAND PDU 400 is associated with a given wireless device 304₃ (for example) that is going perform the MTA procedure. In its simplest form the new Multilateration Timer IE 520 may have an indication 522 which is a single bit flag. In addition, this indication 522 can trigger the SGSN 307 to start a timer 508 (e.g., MTA timer 508). In exemplary applications, the MTA timer 508 can be used by the SGSN 307 to (a) suspend downlink data delivery to the wireless device 304₃ while the wireless device 304₃ is performing the MTA procedure (b) guard against the SGSN 307 being asked to start another MTA positioning procedure with the wireless device 304₃ (for example) by sending a paging message to the wireless device 304₃ while the wireless device 304₃ already has an ongoing MTA positioning procedure, and (c) allow the SGSN 307 to know the maximum time that it should allow for the MTA positioning procedure to be completed by the wireless device 304₃.

Figure 9:
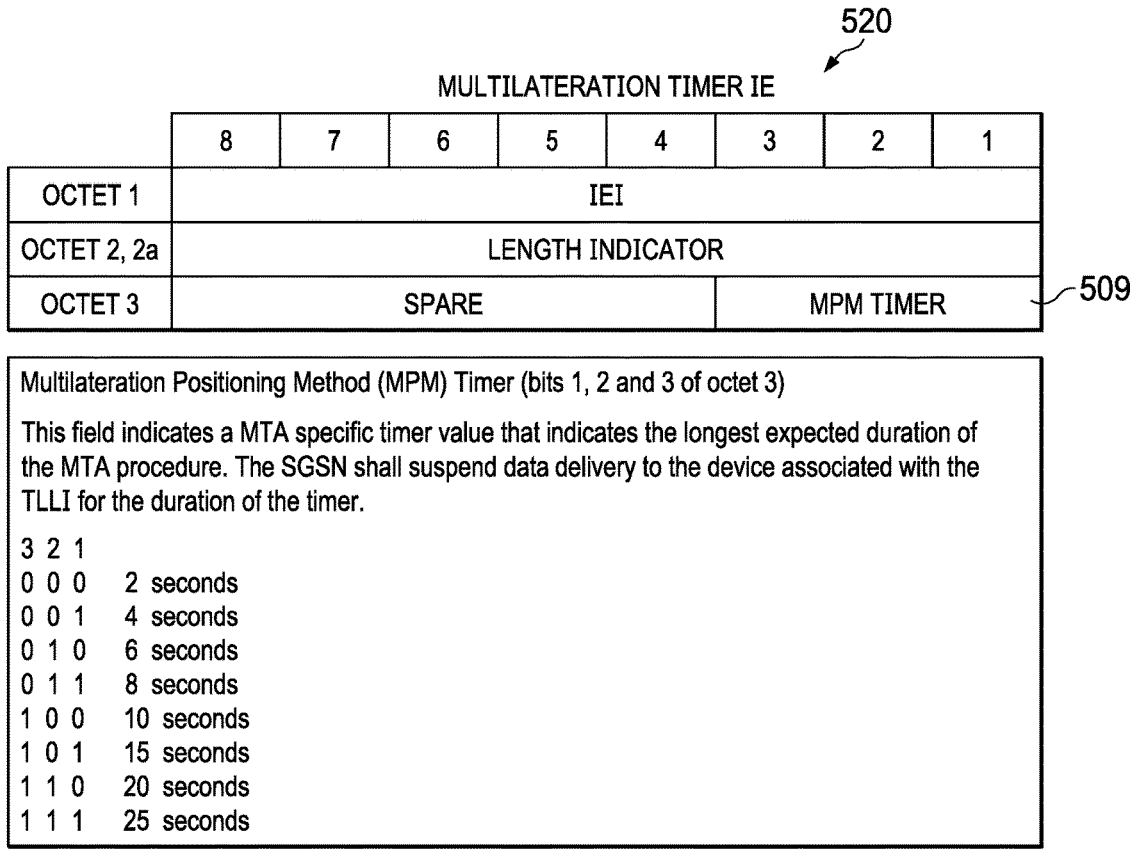
FIG. 9 is a diagram that illustrates the content of the Multilateration Timer IE which includes a MPM timer value in accordance with an embodiment of the present disclosure.

In a second technique, to ensure that the SGSN 307 is aware that a RRLP MTA Request message 404 is being sent to a given wireless device 304₃ (for example), the BSSGP POSITION-COMMAND PDU 400 sent by the BSS 302₂ to the SGSN 307 is enhanced with a new Multilateration Timer IE 520 that not only indicates to the SGSN 307 that the BSSGP POSITION-COMMAND PDU 400 is associated with a given wireless device 304₃ (for example) that is going perform the MTA procedure but also provides the SGSN 307 with a timer value 509 (e.g., MPM timer value 509) which is used to set the MTA timer 508. In exemplary applications, the MTA timer 508 can be used by the SGSN 307 to (a) suspend downlink data delivery to the wireless device 304₃ while the wireless device 304₃ is performing the MTA procedure (b) guard against the SGSN 307 being asked to start another MTA positioning procedure with the wireless device 304₃ (for example) by sending a paging message to the wireless device 304₃ while the wireless device 304₃ already has an ongoing MTA positioning procedure, and (c) allow the SGSN 307 to know the maximum time that it should allow for the MTA positioning procedure to be completed by the wireless device 304₃. The timer value 509 which is provided in the new Multilateration Timer IE 520 to the SGSN 307 is the same timer value which is associated with a Multilateration Positioning Method (MPM) timer 530 that the SMLC 311 transmits in a BSSMAP-LE CONNECTION ORIENTED INFORMATION message 504 (see FIG. 4A's step 9a) to the serving BSS 302₂ (for example) for the purpose of knowing how long the Signalling Connection Control Part (SCCP) connection across the Lb interface shall be maintained (note: the Lb interface is between the SMLC 311 and the BSS 302₂). FIG. 8 is a diagram that illustrates the content of the BSSGP POSITION-COMMAND PDU 400 modified to include the new Multilateration Timer IE 520. FIG. 9 is a diagram that illustrates the content of the new Multilateration Timer IE 520 which includes the MPM timer value 509.

Figure 10:
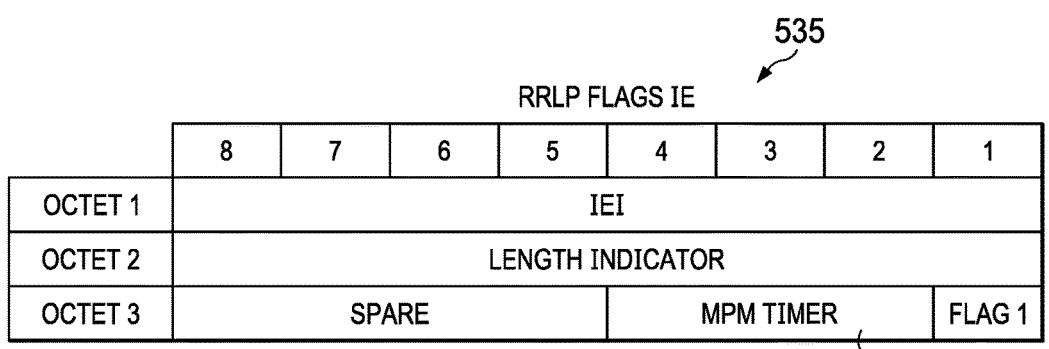
FIG. 10 is a diagram that illustrates the content of a modified RRLP Flags IE which includes a MPM timer value in accordance with an embodiment of the present disclosure.

In a third technique, to ensure that the SGSN 307 is aware that a RRLP MTA Request message 404 is being sent to a given wireless device 304₃ (for example), the BSSGP POSITION-COMMAND PDU 400 sent by the BSS 302₂ to the SGSN 307 is enhanced where a RRLP Flags IE 535 is modified to not only indicate to the SGSN 307 that the BSSGP POSITION-COMMAND PDU 400 is associated with a given wireless device 304₃ (for example) that is going perform the MTA procedure but also provides the SGSN 307 with a timer value 509 which is used to set the MTA timer 508. The timer value 509 which is provided in the RRLP Flags IE 535 to the SGSN 307 is the same timer value 509 which is associated with a Multilateration Positioning Method (MPM) timer 530 that the SMLC 311 provides in the BSSMAP-LE CONNECTION ORIENTED INFORMATION message 504 (see FIG. 4A's step 9a) to the serving BSS 302₂ (for example). In the third technique, the RRLP Flags IE 535 is modified by the BSS 302₂ to include the same timer value 509 as the Multilateration Positioning Method (MPM) timer 530 which both the BSS 302₂ as well as the SGSN 307 can use during the MTA procedure for the given wireless device 304₃. The BSS 302₂ can use the timer value 509 indicated by the RRLP Flags IE 535 to supervise the SCCP connection associated with the wireless device 304₃ (for example). The SGSN 307 can use the timer value 509 indicated by the RRLP Flags IE 535 to suspend downlink data delivery and paging to the wireless device 304₃ for the duration of the MTA timer 508 which is set based on the timer value 509. FIG. 10 is a diagram that illustrates the content of the modified RRLP Flags IE 535 (note: the modified RRLP Flags IE 535 which includes the MPM timer value 509 would be part of the BSSGP POSITION-COMMAND PDU 400 which is shown in detail in FIG. 8).

The modified BSSGP POSITION-COMMAND PDU 400 and the aforementioned three techniques are also described in the co-filed U.S. patent application Ser. No. 15/886,616 entitled "Notification of Ongoing Multilateration Timing Advance (MTA) Procedure to a Serving GPRS Support Node (SGSN)", which claims the benefit of priority to U.S. Provisional Application Ser. No. 62/453,843, filed on Feb. 2, 2017. The entire contents of each of these documents are hereby incorporated herein by reference for all purposes.

Basic Functionalities-Configurations of SGSN 307, the BSS 302₂, and the Wireless Device 304₃

Figure 11:
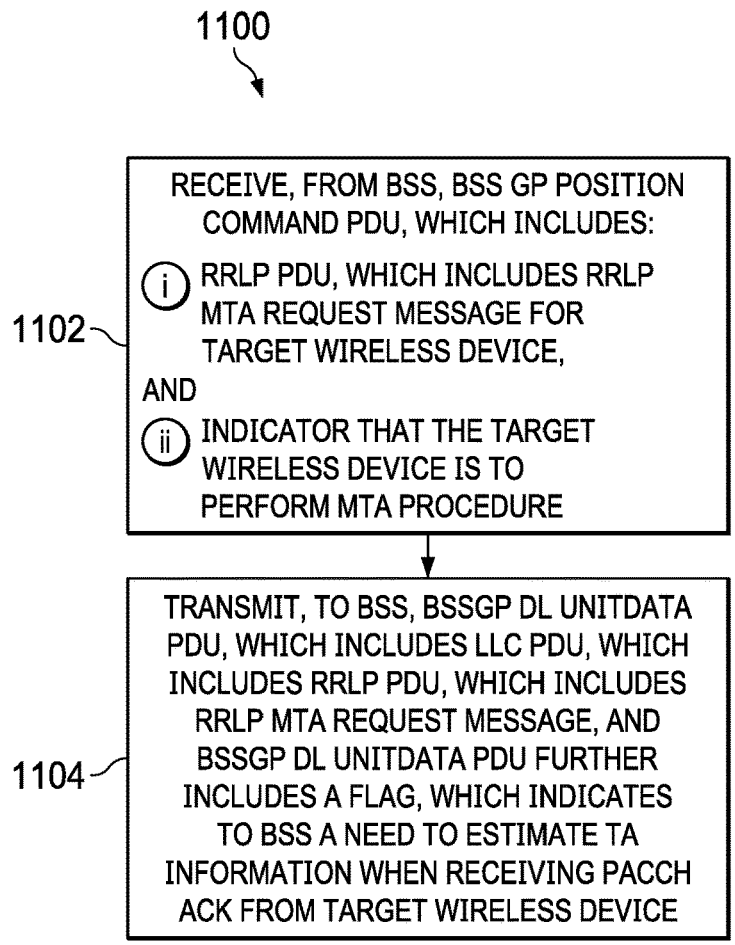
FIG. 11 is a flowchart of a method implemented in the SGSN in accordance with an embodiment of the present disclosure.

Referring to FIG. 11, there is a flowchart of a method 1100 implemented in a SGSN 307 which is configured to interact with a BSS 302₂ in accordance with an embodiment of the present disclosure. At step 1102, the SGSN 307 receives, from the BSS 302₂, a BSSGP POSITION-COMMAND PDU 400 which includes a RRLP PDU 402, wherein the RRLP PDU 402 includes (i) a RRLP MTA Request message 404 intended for a target wireless device 304₃ (for example), and (ii) an indicator 520, 535 that the target wireless device 304₃ is to perform a MTA procedure (see FIG. 4's step 9b). At step 1104, the SGSN 307 transmits, to the BSS 302₂, a BSSGP Down Link (DL)-UNITDATA PDU 410 which includes a LLC PDU 406 intended for the target wireless device 304₃, wherein the LLC PDU 406 includes the RRLP PDU 402, wherein the RRLP PDU 402 further includes the RRLP MTA Request message 404, and wherein the BSSGP DL-UNITDATA PDU 410 further includes a flag 420 (e.g., Message Indicator IE 420a, a code point 420b in a legacy information element) which indicates to the BSS 302₂ a need to estimate timing advance information 413 when receiving a Packet Associated Control Channel (PACCH) acknowledgment 422 from the target wireless device (see FIG. 4's step 10).

Figure 12:
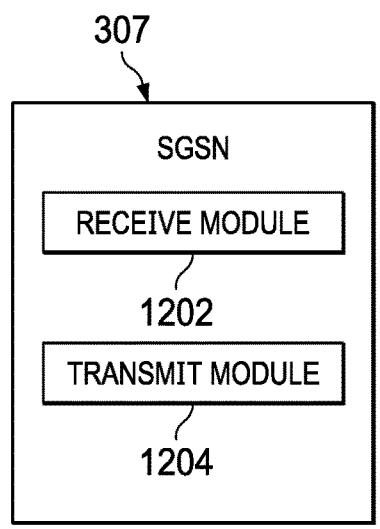
FIG. 12 is a block diagram illustrating a structure of the SGSN configured in accordance with an embodiment of the present disclosure.

Referring to FIG. 12, there is a block diagram illustrating structures of an exemplary SGSN 307 in accordance with an embodiment of the present disclosure. In one embodiment, the SGSN 307 comprises a receive module 1202 and a transmit module 1204. The receive module 1202 is configured to receive, from the BSS 302₂, a BSSGP POSITION-COMMAND PDU 400 which includes (i) a RRLP PDU 402, wherein the RRLP PDU 402 includes a RRLP MTA Request message 404 intended for a target wireless device 304₃ (for example), and (ii) an indicator 520, 535 that the target wireless device 304₃ is to perform a MTA procedure (see FIG. 4's step 9b). The transmit module 1204 is configured to transmit, to the BSS 302₂, a BSSGP Down Link (DL)-UNITDATA PDU 410 which includes a LLC PDU 406 intended for the target wireless device $304_3$, wherein the LLC PDU 406 includes the RRLP PDU 402, wherein the RRLP PDU 402 further includes the RRLP MTA Request message 404, and wherein the BSSGP DL-UNITDATA PDU 410 further includes a flag 420 (e.g., Message Indicator IE 420a, a code point 420b in a legacy information element) which indicates to the BSS $302_2$ a need to estimate timing advance information 413 when receiving a Packet Associated Control Channel (PACCH) acknowledgment 422 from the target wireless device (see FIG. 4's step 10). It should be noted that the SGSN 307 may also include other components, modules or structures which are well-known, but for clarity, only the components, modules or structures needed to describe the features of the present disclosure are described herein.

As those skilled in the art will appreciate, the above-described modules 1202 and 1204 of the SGSN 307 may be implemented separately as suitable dedicated circuits. Further, the modules 1202 and 1204 can also be implemented using any number of dedicated circuits through functional combination or separation. In some embodiments, the modules 1202 and 1204 may be even combined in a single application specific integrated circuit (ASIC). As an alternative software-based implementation, the SGSN 307 may comprise a memory 348, a processor 346 (including but not limited to a microprocessor, a microcontroller or a Digital Signal Processor (DSP), etc.) and a transceiver 336. The memory 348 stores machine-readable program code executable by the processor 346 to cause the SGSN 307 to perform the steps of the above-described method 1100.

Figure 13:
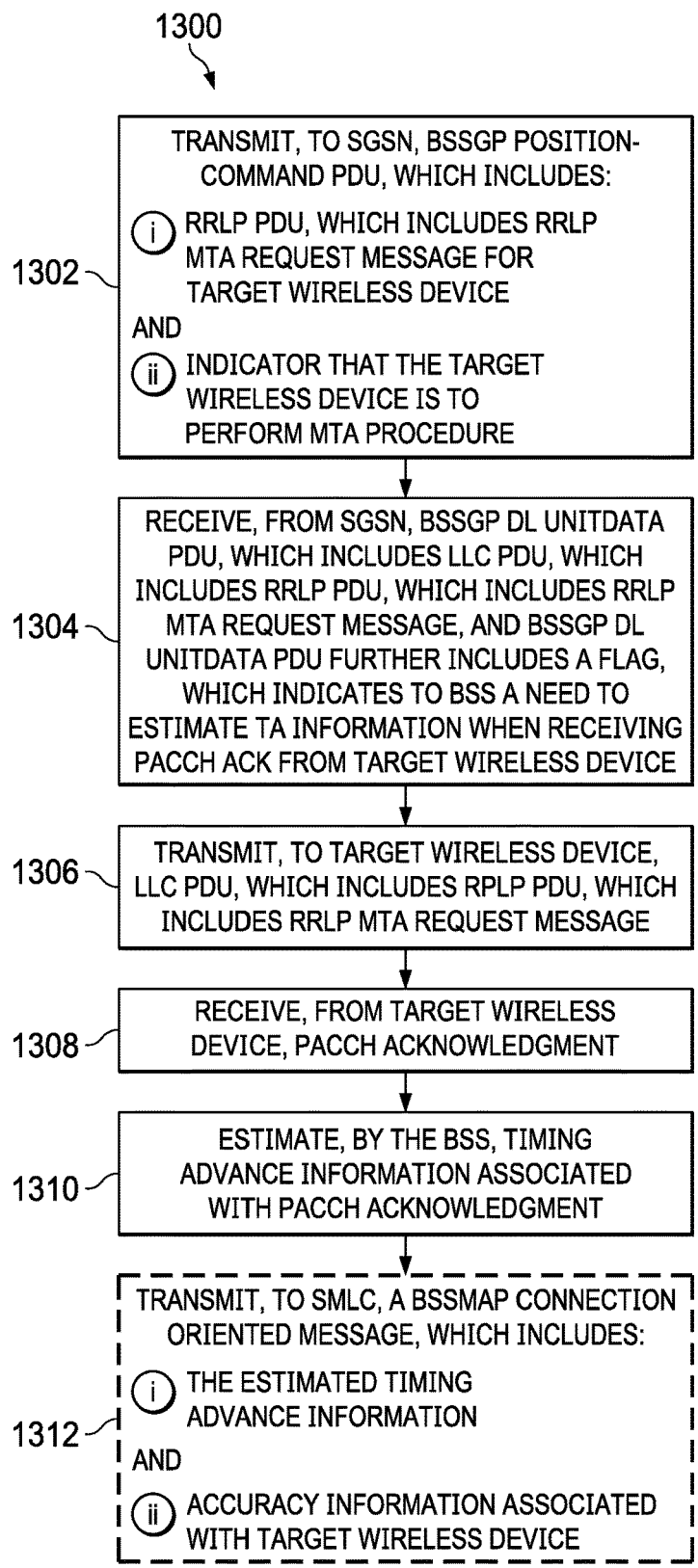
FIG. 13 is a flowchart of a method implemented in the BSS in accordance with an embodiment of the present disclosure.

Referring to FIG. 13, there is a flowchart of a method 1300 implemented in a BSS $302_2$ that is configured to interact with a SGSN 307 and a target wireless device $304_3$ in accordance with an embodiment of the present disclosure. At step 1302, the BSS $302_2$, transmits, to the SGSN 307, a BSSGP POSITION-COMMAND PDU 400 which includes (i) a RRLP PDU 402, wherein the RRLP PDU 402 includes a RRLP MTA Request message 404 intended for the target wireless device $304_3$, and (ii) an indicator 520, 535 that the target wireless device $304_3$ is to perform a MTA procedure (see FIG. 4's step 9b). At step 1304, the BSS $302_2$ receives, from the SGSN 307, a BSSGP DL-UNITDATA PDU 410 which includes a LLC PDU 406 intended for the target wireless device $304_3$, wherein the LLC PDU 406 includes the RRLP PDU 402, wherein the RRLP PDU 402 further includes the RRLP MTA Request Message 404 (see FIG. 4's step 10). At step 1306, the BSS $302_2$ transmits, to the target wireless device $304_3$, the LLC PDU 406, wherein the LLC PDU 406 includes the RRLP PDU 402, and wherein the RRLP PDU 402 further includes the RRLP MTA Request message 404 (see FIG. 4's step 10). At step 1308, the BSS $302_2$ in response to transmitting the LLC PDU 406, receives a PACCH acknowledgment 422 (e.g., EC-PACCH acknowledgment) from the target wireless device $304_3$ (see FIG. 4's step 10). At step 1310, the BSS $302_2$ when receiving the PACCH acknowledgment 422, estimates (e.g., using at least one of an oversampling process and an interpolation process) timing advance information 413 associated with the PACCH acknowledgment 422, wherein the BSS $302_2$ is informed of a need to estimate the timing advance information 413 when receiving the PACCH acknowledgment 422 by a flag 420 (e.g., Message Indicator IE 420a, code point 420b in a legacy IE) within the BSSGP DL-UNITDATA PDU 420 (see FIG. 4's step 11). At step 1312, the BSS $302_2$ can transmit, to a SMLC 311, a BSSMAP Connection Oriented Message 424 which includes (i) the estimated timing advance information 413; and (ii) accuracy information 415 (e.g., the MS Sync Accuracy associated with the target wireless device $304_3$ and the BTS Receiver Accuracy associated with the BTS that receives the PACCH acknowledgment 422). It should be appreciated that the BSS $302_1$ (and other BSSs) would also perform method 1300.

Figure 14:
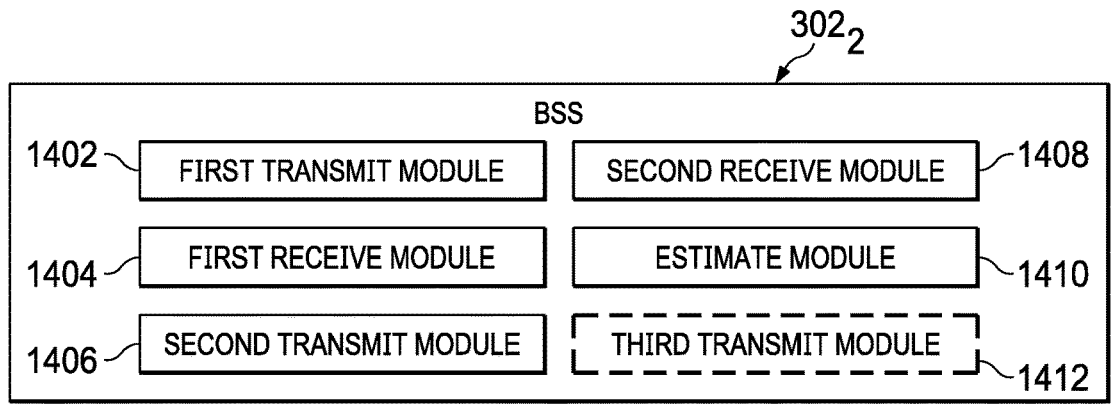
FIG. 14 is a block diagram illustrating a structure of the BSS configured in accordance with an embodiment of the present disclosure.

Referring to FIG. 14, there is a block diagram illustrating structures of an exemplary BSS $302_2$ in accordance with an embodiment of the present disclosure. In one embodiment, the BSS $302_2$ comprises a first transmit module 1402, a first receive module 1404, a second transmit module 1406, a second receive module 1408, an estimate module 1410, and an optional third transmit module 1412. The first transmit module 1402 is configured to transmit, to the SGSN 307, a BSSGP POSITION-COMMAND PDU 400 which includes (i) a RRLP PDU 402, wherein the RRLP PDU 402 includes a RRLP MTA Request message 404 intended for the target wireless device $304_3$, and (ii) an indicator 520, 535 that the target wireless device $304_3$ is to perform a MTA procedure (see FIG. 4's step 9b). The first receive module 1404 is configured to receive, from the SGSN 307, a BSSGP DL-UNITDATA PDU 410 which includes a LLC PDU 406 intended for the target wireless device $304_3$, wherein the LLC PDU 406 includes the RRLP PDU 402, wherein the RRLP PDU 402 further includes the RRLP MTA Request Message 404 (see FIG. 4's step 10). The second transmit module 1406 is configured to transmit, to the target wireless device $304_3$, the LLC PDU 406, wherein the LLC PDU 406 includes the RRLP PDU 402, and wherein the RRLP PDU 402 further includes the RRLP MTA Request message 404 (see FIG. 4's step 10). The second receive module 1408 in response to the transmission of the LLC PDU 406 is configured to receive a PACCH acknowledgment 422 (e.g., EC-PACCH acknowledgment) from the target wireless device $304_3$ (see FIG. 4's step 10). The estimate module 1410 when receiving the PACCH acknowledgment 422 is configured to estimate (e.g., using at least one of an oversampling process and an interpolation process) timing advance information 413 associated with the PACCH acknowledgment 422, wherein the estimating module 1410 is informed of a need to estimate the timing advance information 413 when receiving the PACCH acknowledgment 422 by a flag 420 (e.g., Message Indicator IE 420a, code point 420b in a legacy IE) within the BSSGP DL-UNITDATA PDU 420 (see FIG. 4's step 11). The optional third transmit module 1412 can be configured to transmit, to the SMLC 311, a BSSMAP Connection Oriented Message 424 which includes (i) the estimated timing advance information 413; and (ii) accuracy information 415 (e.g., the MS Sync Accuracy associated with the target wireless device $304_3$ and the BTS Receiver Accuracy associated with the BTS that receives the PACCH acknowledgment 422). It should be noted that the BSS $302_2$ may also include other components, modules or structures which are well-known, but for clarity, only the components, modules or structures needed to describe the features of the present disclosure are described herein.

As those skilled in the art will appreciate, the above-described modules 1402, 1404, 1406, 1408, 1410, and 1412 may be implemented separately as suitable dedicated circuits. Further, the modules 1402, 1404, 1406, 1408, 1410, and 1412 can also be implemented using any number of dedicated circuits through functional combination or separation. In some embodiments, the modules 1402, 1404, 1406, 1408, 1410, and 1412 may be even combined in a single application specific integrated circuit (ASIC). As an alternative software-based implementation, the BSS $302_2$ may comprise a memory $334_2$, a processor $332_1$ (including but not limited to a microprocessor, a microcontroller or a Digital Signal Processor (DSP), etc.) and a transceiver $322_2$. The memory $334_2$ stores machine-readable program code executable by the processor $332_2$ to cause the BSS $302_2$ to perform the steps of the above-described method 1300.

Figure 15:
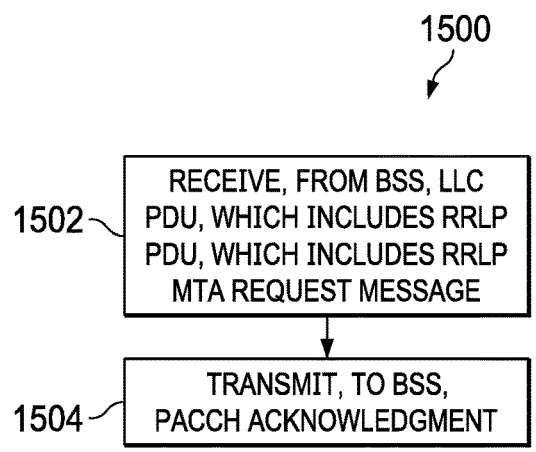
FIG. 15 is a flowchart of a method implemented in the wireless device in accordance with an embodiment of the present disclosure; and, FIG. 16 is a block diagram illustrating a structure of the wireless device configured in accordance with an embodiment of the present disclosure.

Referring to FIG. 15, there is a flowchart of a method 1500 implemented in a wireless device $304_3$ that is configured to interact with a BSS $302_2$ in accordance with an embodiment of the present disclosure. At step 1502, the wireless device $304_3$ receives, from the BSS $302_2$, a LLC PDU 406, wherein the LLC PDU 406 includes a RRLP PDU 402, wherein the RRLP PDU 402 further includes a RRLP MTA Request Message 404 which indicates that the wireless device $304_3$ does not need to perform a Multilateration Timing Advance procedure in a serving cell (see FIG. 4's step 10). At step 1504, the wireless device $304_3$ in response to receiving the LLC PDU 406, transmits a PACCH acknowledgment 422 (e.g., EC-PACCH acknowledgment 422) to the BSS $302_2$ (see FIG. 4's step 10). It should be appreciated that the other wireless devices $304_1$, $304_2$ . . . $304_n$ would also perform method 1500.

Figure 16:
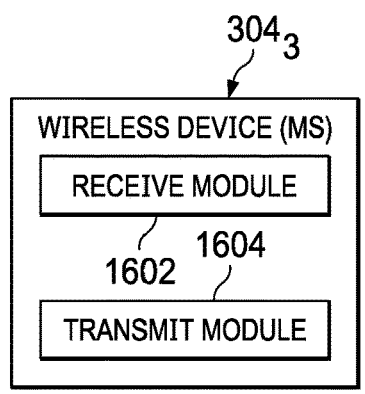

Referring to FIG. 16, there is a block diagram illustrating structures of an exemplary wireless device $304_3$ in accordance with an embodiment of the present disclosure. In one embodiment, the wireless device $304_3$ comprises a receive module 1602 and a transmit module 1604. The receive module 1602 is configured to receive, from the BSS $302_2$, a LLC PDU 406, wherein the LLC PDU 406 includes a RRLP PDU 402, wherein the RRLP PDU 402 further includes a RRLP MTA Request Message 404 which indicates that the wireless device $304_3$ does not need to perform a Multilateration Timing Advance procedure in a serving cell (see FIG. 4's step 10). The transmit module 1604 in response to receiving the LLC PDU 406 is configured to transmit a PACCH acknowledgment 422 (e.g., EC-PACCH acknowledgment 422) to the BSS $302_2$ (see FIG. 4's step 10). It should be noted that the wireless device $304_3$ may also include other components, modules or structures which are well-known, but for clarity, only the components, modules or structures needed to describe the features of the present disclosure are described herein.

As those skilled in the art will appreciate, the above-described modules 1602 and 1604 of the wireless device $304_3$ may be implemented separately as suitable dedicated circuits. Further, the modules 1602 and 1604 can also be implemented using any number of dedicated circuits through functional combination or separation. In some embodiments, the modules 1602 and 1604 may be even combined in a single application specific integrated circuit (ASIC). As an alternative software-based implementation, the wireless device $304_3$ may comprise a memory $320_3$, a processor $318_3$ (including but not limited to a microprocessor, a microcontroller or a Digital Signal Processor (DSP), etc.) and a transceiver $310_3$. The memory $320_3$ stores machine-readable program code executable by the processor $318_3$ to cause the wireless device $304_3$ to perform the steps of the above-described method 1500.

In view of the foregoing, it will be appreciated by those skilled in the art that an objective of the present disclosure is to enable the SGSN 307 to provide the BSS $302_2$ (for example) with an indication, e.g., in the form of a flag 420, that the LLC PDU 406 sent to a given wireless device $304_3$ (for example) contains a RRLP Multilateration Timing Advance Request message 404 such that the BSS $302_2$ may invoke more advanced Timing Advance estimation algorithms for reception of the subsequent uplink (EC-) PACCH acknowledgment block(s) 422 received from the wireless device $304_3$. Recall: the BSS $302_2$ sends the wireless device $304_3$ an EC Downlink Assignment message to establish a downlink TBF which is then used to deliver the LLC PDU 406 to the wireless device $304_3$. When the EC Downlink Assignment message includes the "Multilateration Information Request" IE (see section 9.1.64 of 3GPP TS 44.018 v14.0.0 dated Dec. 23, 2016-12-23—the contents of which are incorporated herein by reference for all purposes), it serves to inform the wireless device $304_3$ that it is to include "MS Transmission Offset" and "MS Sync Accuracy" information in the one or more PACCH acknowledgments 422 that the wireless device $304_3$ sends in response to receiving the LLC PDU 406, i.e., even though the BSS $302_2$ is informed of a need to estimate the timing advance information using advanced procedures by the flag 420 within the BSSGP DL-UNITDATA PDU 410 per FIG. 4B's step 10, the BSS $302_2$ will not be able to actually perform the advanced procedures unless it first uses the "Multilateration Information Request" IE to tell the wireless device $304_3$ to include "MS Transmission Offset" and "MS Sync Accuracy" information in the one or more PACCH acknowledgments 422 (note: the inclusion of the "Multilateration Information Request" IE in the EC Downlink Assignment is covered by prior art). An advantage with the proposed solution is that the BSS $302_2$ will know when a triggering RRLP PDU 402 (containing a RRLP Multilateration Timing Advance Request message 404) is included within a LLC PDU 406 received within a BSSGP DL-UNITDATA PDU 410 from the SGSN 307 and thus the BSS $302_2$ now knows it should invoke more advanced Timing Advance estimation algorithms when receiving one or more (EC-)PACCH Packet Downlink Acks 422 from the wireless device $304_3$ after sending the wireless device $304_3$ the LLC PDU 406. This in turn has the following advantages:

- The RRLP Multilateration Timing Advance Request message 404 sent to the wireless device $304_3$ can avoid indicating the need for the wireless device $304_3$ to perform the Multilateration Timing Advance procedure using the serving cell since the BSS $302_2$ will acquire the necessary Timing Advance value, the BTS receiver accuracy and the wireless device $304_3$'s accuracy parameter and forward them to the SMLC 311 (see FIG. 4B's step 12). This helps to limit battery consumption in the wireless device $304_3$.
- Avoiding the wireless device $304_3$ having to perform the Multilateration Timing Advance procedure in the serving cell after the BSS $302_2$ has successfully sent the RRLP PDU 402 (containing a RRLP Multilateration Timing Advance Request message 404) to the wireless device $304_3$ will reduce processing load in the BSS 302's BTS.

It should be appreciated that in the above described embodiments that these embodiments are exemplary and not mutually exclusive. For example, components from one embodiment may be tacitly assumed to be present in another embodiment and it will be obvious to a person skilled in the art how those components may be used in the other exemplary embodiments.

The exemplary embodiments described herein have been exemplified with Global System for Mobile telephony (GSM)/Enhanced Data rates for GSM Evolution (EDGE) as the communications network 300. The core network node 307 has been exemplified herein as being a Serving GPRS Support Node (SGSN) 307, but generally the core network node 307 may be any type of core network node that is serving the wireless device as well. For example, for NB- IoT the applicable core network node 307 may also be a Mobility Management Entity (MME). The radio access network node 302₂ (controller node 302₂) has been exemplified herein as being a BSS 302₂ but generally the radio access network node 302₂ may be any type of radio access network node 302₂ that is serving the wireless device as well. The positioning node 311 has been exemplified herein as being a SMLC node 311 but may, e.g., for NB-IoT be an Evolved Serving Mobile Location Center (E-SMLC) node 311.

It should further be noted that, to anyone skilled in the art, there are several realizations of the embodiments described herein with principally equivalent functionality where e.g., introduced fields may be longer or shorter or coded in a different way. In addition, it should be noted that message names, parameters, and information elements may change during the course of the specification work, which implies the e.g., message names such as RRLP MULTILATERATION REQUEST message and RRLP Positioning Multilateration Timing Advance message shall be considered to be equivalent. This principle also applies to other messages, parameters, and information element names used herein so long as the principal use/function remain the same.

Those skilled in the art will appreciate that the use of the term "exemplary" is used herein to mean "illustrative," or "serving as an example," and is not intended to imply that a particular embodiment is preferred over another or that a particular feature is essential. Likewise, the terms "first" and "second," and similar terms, are used simply to distinguish one particular instance of an item or feature from another, and do not indicate a particular order or arrangement, unless the context clearly indicates otherwise. Further, the term "step," as used herein, is meant to be synonymous with "operation" or "action." Any description herein of a sequence of steps does not imply that these operations must be carried out in a particular order, or even that these operations are carried out in any order at all, unless the context or the details of the described operation clearly indicates otherwise.

Of course, the present disclosure may be carried out in other specific ways than those herein set forth without departing from the scope and essential characteristics of the invention. One or more of the specific processes discussed above may be carried out in a cellular phone or other communications transceiver comprising one or more appropriately configured processing circuits, which may in some embodiments be embodied in one or more application-specific integrated circuits (ASICs). In some embodiments, these processing circuits may comprise one or more microprocessors, microcontrollers, and/or digital signal processors programmed with appropriate software and/or firmware to carry out one or more of the operations described above, or variants thereof. In some embodiments, these processing circuits may comprise customized hardware to carry out one or more of the functions described above. The present embodiments are, therefore, to be considered in all respects as illustrative and not restrictive.

Although multiple embodiments of the present disclosure have been illustrated in the accompanying Drawings and described in the foregoing Detailed Description, it should be understood that the invention is not limited to the disclosed embodiments, but instead is also capable of numerous rearrangements, modifications and substitutions without departing from the present disclosure that as has been set forth and defined within the following claims.

The invention claimed is:

1. A Serving GPRS Support Node (SGSN) configured to interact with a Base Station Subsystem (BSS), the SGSN comprising:
    a processor; and,
    a memory that stores processor-executable instructions, wherein the processor interfaces with the memory to execute the processor-executable instructions, whereby the SGSN is operable to:
    receive, from the BSS, a BSS General Packet Radio Service (GPRS) Protocol (BSSGP) POSITION-COMMAND Packet Data Unit (PDU) which includes (i) a Radio Resource Location Services Protocol (RRLP) PDU, wherein the RRLP PDU includes a RRLP Multilateration Timing Advance (MTA) Request message intended for a target wireless device, and (ii) an indicator that the target wireless device is to perform a MTA procedure; and
    transmit, to the BSS, a BSSGP Down Link (DL)-UNITDATA PDU which includes a Logical Link Control (LLC) PDU intended for the target wireless device, wherein the LLC PDU includes the RRLP PDU, wherein the RRLP PDU further includes the RRLP MTA Request Message, wherein the BSSGP DL-UNITDATA PDU further includes a flag which indicates to the BSS a need to estimate timing advance information when receiving a Packet Associated Control Channel (PACCH) acknowledgment from the target wireless device.

2. The SGSN of claim 1, wherein the indicator is a Multilateration Timer Information Element that includes a timer value indicating a duration that the target wireless device is to perform the MTA procedure.

3. The SGSN of claim 1, wherein the flag is an information element.

4. The SGSN of claim 1, wherein the PACCH acknowledgment is an Extended Coverage (EC) PACCH Packet Downlink acknowledgment.

5. A method implemented in a Serving GPRS Support Node (SGSN) configured to interact with a Base Station Subsystem (BSS), the method comprising:
    receiving, from the BSS, a BSS General Packet Radio Service (GPRS) Protocol (BSSGP) POSITION-COMMAND Packet Data Unit (PDU) which includes (i) a Radio Resource Location Services Protocol (RRLP) PDU, wherein the RRLP PDU includes a RRLP Multilateration Timing Advance (MTA) Request message intended for a target wireless device, and (ii) an indicator that the target wireless device is to perform a MTA procedure; and
    transmitting, to the BSS, a BSSGP Down Link (DL)-UNITDATA PDU which includes a Logical Link Control (LLC) PDU intended for the target wireless device, wherein the LLC PDU includes the RRLP PDU, wherein the RRLP PDU further includes the RRLP MTA Request Message, wherein the BSSGP DL-UNITDATA PDU further includes a flag which indicates to the BSS a need to estimate timing advance information when receiving a Packet Associated Control Channel (PACCH) acknowledgment from the target wireless device.

6. The method of claim 5, wherein the indicator is an Multilateration Timer Information Element that includes a timer value indicating a duration that the target wireless device is to perform the MTA procedure.

7. The method of claim 5, wherein the flag is an information element.

8. The method of claim 5, wherein the PACCH acknowledgment is an Extended Coverage (EC) PACCH Packet Downlink acknowledgment.

9. A Base Station Subsystem (BSS) configured to interact with a Serving GPRS Support Node (SGSN) and a target wireless device, the BSS comprising:
  a processor; and,
  a memory that stores processor-executable instructions, wherein the processor interfaces with the memory to execute the processor-executable instructions, whereby the BSS is operable to:
    transmit, to the SGSN, a BSS General Packet Radio Service (GPRS) Protocol (BSSGP) POSITION-COMMAND Packet Data Unit (PDU) which (i) includes a Radio Resource Location Services Protocol (RRLP) PDU, wherein the RRLP PDU includes a RRLP Multilateration Timing Advance (MTA) Request message intended for the target wireless device, and (ii) an indicator that the target wireless device is to perform a MTA procedure;
    receive, from the SGSN, a BSSGP Down Link (DL)-UNITDATA PDU which includes a Logical Link Control (LLC) PDU intended for the target wireless device, wherein the LLC PDU includes the RRLP PDU, wherein the RRLP PDU further includes the RRLP MTA Request Message;
    transmit, to the target wireless device, the LLC PDU which includes the RRLP PDU, wherein the RRLP PDU further includes the RRLP MTA Request Message;
    in response to transmitting the LLC PDU, receive a Packet Associated Control Channel (PACCH) acknowledgment from the target wireless device; and,
    when receiving the PACCH acknowledgment, estimate timing advance information associated with the PACCH acknowledgment, wherein the BSS is informed of a need to estimate the timing advance information when receiving the PACCH acknowledgment by a flag within the BSSGP DL-UNITDATA PDU.

10. The BSS of claim 9, wherein the indicator is an Multilateration Timer Information Element that includes a timer value indicating a duration that the target wireless device is to perform the MTA procedure.

11. The BSS of claim 9, wherein the flag is an information element.

12. The BSS of claim 9, wherein the PACCH acknowledgment is an Extended Coverage (EC) PACCH Packet Downlink acknowledgment.

13. The BSS of claim 9, wherein the BSS when performing the estimate operation is further operable to use at least one of an oversampling process and an interpolation process when receiving the PACCH acknowledgment to estimate the timing advance information.

14. The BSS of claim 9, wherein the BSS is further operable to transmit, to a Serving Mobile Location Center (SMLC), a BSSMAP Connection Oriented Message which includes (i) the estimated timing advance information; and (ii) accuracy information associated with the target wireless device.

15. A method implemented in a Base Station Subsystem (BSS) configured to interact with a Serving GPRS Support Node (SGSN) and a target wireless device, the method comprising:
  transmitting, to the SGSN, a BSS General Packet Radio Service (GPRS) Protocol (BSSGP) POSITION-COMMAND Packet Data Unit (PDU) which includes (i) a Radio Resource Location Services Protocol (RRLP) PDU, wherein the RRLP PDU includes a RRLP Multilateration Timing Advance (MTA) Request message intended for the target wireless device, and (ii) an indicator that the target wireless device is to perform a MTA procedure;
  receiving, from the SGSN, a BSSGP Down Link (DL)-UNITDATA PDU which includes a Logical Link Control (LLC) PDU intended for the target wireless device, wherein the LLC PDU includes the RRLP PDU, wherein the RRLP PDU further includes the RRLP MTA Request Message;
  transmitting, to the target wireless device, the LLC PDU includes the RRLP PDU, wherein the RRLP PDU further includes the RRLP MTA Request Message;
  in response to transmitting the LLC PDU, receiving a Packet Associated Control Channel (PACCH) acknowledgment from the target wireless device; and,
  when receiving the PACCH acknowledgment, estimating timing advance information associated with the PACCH acknowledgment, wherein the BSS is informed of a need to estimate the timing advance information when receiving the PACCH acknowledgment by a flag within the BSSGP DL-UNITDATA PDU.

16. The method of claim 15, wherein the indicator is an Multilateration Timer Information Element that includes a timer value indicating a duration that the target wireless device is to perform the MTA procedure.

17. The method of claim 15, wherein the flag is an information element.

18. The method of claim 15, wherein the PACCH acknowledgment is an Extended Coverage (EC) PACCH Packet Downlink acknowledgment.

19. The method of claim 15, wherein the step of estimating further comprises a step of using at least one of an oversampling process and an interpolation process when receiving the PACCH acknowledgment to estimate the timing advance information.

20. The method of claim 15, further comprising a step of transmitting, to a Serving Mobile Location Center (SMLC), a BSSMAP Connection Oriented Message which includes (i) the estimated timing advance information; and (ii) accuracy information associated with the target wireless device.

21. A wireless device configured to interact with a Base Station Subsystem (BSS), the wireless device comprising:
  a processor; and,
  a memory that stores processor-executable instructions, wherein the processor interfaces with the memory to execute the processor-executable instructions, whereby the wireless device is operable to:
    receive, from the BSS, a Logical Link Control (LLC) Packet Data Unit (PDU), wherein the LLC PDU includes a Radio Resource Location Service Protocol (RRLP) PDU, wherein the RRLP PDU further includes a RRLP Multilateration Timing Advance Request Message which indicates that the wireless device does not need to perform a Multilateration Timing Advance procedure in a serving cell; and,
    in response to receiving the LLC PDU, transmit a Packet Associated Control Channel (PACCH) acknowledgment to the BSS.

22. The wireless device of claim 21, wherein the PACCH acknowledgment is an Extended Coverage (EC) PACCH Packet Downlink acknowledgment.

23. A method implemented in a wireless device configured to interact with a Base Station Subsystem (BSS), the method comprising:
- receiving, from the BSS, a Logical Link Control (LLC) Packet Data Unit (PDU), wherein the LLC PDU includes a Radio Resource Location Service Protocol (RRLP) PDU, wherein the RRLP PDU further includes a RRLP Multilateration Timing Advance Request Message which indicates that the wireless device does not need to perform a Multilateration Timing Advance procedure in a serving cell; and,
- in response to receiving the LLC PDU, transmitting a Packet Associated Control Channel (PACCH) acknowledgment to the BSS.

24. The method of claim 23, wherein the PACCH acknowledgment is an Extended Coverage (EC) PACCH Packet Downlink acknowledgment.

* * * * *